United States Patent
Nam et al.

(10) Patent No.: US 11,627,578 B2
(45) Date of Patent: Apr. 11, 2023

(54) BEAM SWITCHING OPERATION FOR SYSTEMS WITH HIGH SUBCARRIER SPACING

(71) Applicant: QUALCOMM Incorporated, San Diego, CA (US)

(72) Inventors: Wooseok Nam, San Diego, CA (US); Tao Luo, San Diego, CA (US); Jing Sun, San Diego, CA (US); Xiaoxia Zhang, San Diego, CA (US); Zhifei Fan, San Diego, CA (US); Juan Montojo, San Diego, CA (US); Ahmed Abdelaziz Ibrahim Abdelaziz Zewail, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/225,893

(22) Filed: Apr. 8, 2021

(65) Prior Publication Data
US 2021/0321383 A1    Oct. 14, 2021

Related U.S. Application Data

(60) Provisional application No. 63/008,524, filed on Apr. 10, 2020.

(51) Int. Cl.
*H04W 72/04* (2009.01)
*H04W 72/044* (2023.01)
(Continued)

(52) U.S. Cl.
CPC ........... *H04W 72/046* (2013.01); *H04W 8/22* (2013.01); *H04W 72/0446* (2013.01)

(58) Field of Classification Search
CPC .............. H04W 72/046; H04W 8/22; H04W 72/0446; H04W 16/28; H04L 5/0091;
(Continued)

(56) References Cited

U.S. PATENT DOCUMENTS

2018/0131493 A1    5/2018  Luo et al.
2019/0037509 A1*   1/2019  Li ....................... H04W 56/001
(Continued)

OTHER PUBLICATIONS

"3rd Generation Partnership Project; Technical Specification Group Radio Access Network; NR; User Equipment (UE) Radio Access Capabilities (Release 16)" 3GPP Standard; Technical Specification; 3GPP TS 38.306, 3rd Generation Partnership Project (3GPP), Mobile Competence Centre, 650, Route Des Lucioles, F-06921, Sophia-Antipolis Cedex, France, vol. RAN WG2, No. V16.0.0, Apr. 8, 2020 (Apr. 8, 2020), pp. 1-64, XP051893892, Retrieved from the Internet: URL: http://ftp.3gpp.org/Specs/archive/38_series/38.306/38306-g00.zip 38306-g00.docx [retrieved on Apr. 8, 2020] pp. 20, 24.

(Continued)

*Primary Examiner* — Lan-Huong Truong
(74) *Attorney, Agent, or Firm* — Holland & Hart LLP

(57) ABSTRACT

Methods, systems, and devices for wireless communications are described. A device such as a user equipment (UE) or a base station may identify a beam switching capability of the UE, the beam switching capability indicating a threshold quantity of beam switches during a transmission time interval, a threshold quantity of symbol periods between beam switching operations, or a combination thereof. The device may determine that the beam switching capability of the UE is satisfied based at least in part on one or more parameters (e.g., one or more symbol period durations, one or more quantities of beam switches during a transmission time interval, one or more adjustment parameters, one or more threshold values associated with the capability of the UE, (Continued)

etc.). The device may perform one or more beam switching operations based on determining that the beam switching capability is satisfied.

30 Claims, 16 Drawing Sheets

(51) Int. Cl.
*H04W 8/22* (2009.01)
*H04W 72/0446* (2023.01)

(58) Field of Classification Search
CPC ..... H04L 5/0048; H04L 5/001; H04B 7/0695; H04B 7/088
See application file for complete search history.

(56) References Cited

U.S. PATENT DOCUMENTS

| | | | |
|---|---|---|---|
| 2019/0394634 A1* | 12/2019 | Akkarakaran | H04B 7/0617 |
| 2020/0021351 A1* | 1/2020 | Tang | H04B 7/0617 |
| 2020/0178280 A1* | 6/2020 | Guan | H04B 7/088 |
| 2021/0083748 A1* | 3/2021 | Guan | H04L 5/0091 |

OTHER PUBLICATIONS

International Search Report and Written Opinion—PCT/US2021/026602—ISA/EPO—Jun. 30, 2021.

* cited by examiner

BEAM SWITCHING OPERATION FOR SYSTEMS WITH HIGH SUBCARRIER SPACING

CROSS REFERENCE

The present Application for Patent claims the benefit of U.S. Provisional Patent Application No. 63/008,524 by NAM et al., entitled "BEAM SWITCHING OPERATION FOR SYSTEMS WITH HIGH SUBCARRIER SPACING," filed Apr. 10, 2020, assigned to the assignee hereof, and expressly incorporated by reference herein.

FIELD OF TECHNOLOGY

The following relates generally to wireless communications and more specifically to beam switching operation for systems with high subcarrier spacing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Devices of a wireless communications system, such as UEs and base stations, may support beamforming to enhance communication reliability and efficiency using directional signal transmission. These devices may switch between various directional beams during a transmission period, and the ability to efficiently switch between beams may be limited by the hardware of a device.

SUMMARY

The described techniques relate to improved methods, systems, devices, and apparatuses that support beam switching operation for systems with high subcarrier spacing. Generally, the described techniques may enable devices in a wireless communications system (e.g., a user equipment (UE) or a base station) to implement one or more beam switching rules as described herein, which may result in improved performance in the wireless communications system. For example, a device may identify a beam switching capability of a UE (e.g., a number of beam switches that a UE may conduct per a number of slots, a threshold beam dwell time such as a minimum beam dwell time between one or more beam switching operations, or both). The device may determine that the beam switching capability of the UE is satisfied based at least in part on the one or more beam switching rules. For example, the device may determine a first quantity of beam switches associated with a first symbol period of a transmission time interval and a second quantity of beam switches associated with remaining symbol periods of the transmission time interval. The device may determine that the capability is satisfied based on comparing the first quantity of beam switches and the second quantity of beam switches to a threshold quantity of beam switches indicated by the beam switching capability of the UE. In some examples, the device may adjust the first quantity of beam switches by an adjustment parameter. Additionally or alternatively, the device may determine that the capability is satisfied based on comparing a time period between beam switching operations to a threshold quantity of symbol periods. In some examples, the device may adjust the threshold quantity of symbol periods for the first symbol period of the transmission time interval based on an adjustment parameter associated with the first symbol period.

A method of wireless communications at a UE is described. The method may include receiving a configuration indicating a subcarrier spacing for communications between the UE and a base station, identifying a beam switching capability of the UE associated with the indicated subcarrier spacing, the beam switching capability indicating a threshold quantity of beam switches during a transmission time interval, determining a first quantity of beam switches associated with a first symbol period of the transmission time interval and a second quantity of beam switches associated with remaining symbol periods of the transmission time interval, and determining that the beam switching capability of the UE is satisfied based on comparing the determined first quantity of beam switches and the determined second quantity of beam switches with the indicated threshold quantity of beam switches.

An apparatus for wireless communications at a UE is described. The apparatus may include a processor, memory coupled with the processor, and instructions stored in the memory. The instructions may be executable by the processor to cause the apparatus to receive a configuration indicating a subcarrier spacing for communications between the UE and a base station, identify a beam switching capability of the UE associated with the indicated subcarrier spacing, the beam switching capability indicating a threshold quantity of beam switches during a transmission time interval, determine a first quantity of beam switches associated with a first symbol period of the transmission time interval and a second quantity of beam switches associated with remaining symbol periods of the transmission time interval, and determine that the beam switching capability of the UE is satisfied based on comparing the determined first quantity of beam switches and the determined second quantity of beam switches with the indicated threshold quantity of beam switches.

Another apparatus for wireless communications at a UE is described. The apparatus may include means for receiving a configuration indicating a subcarrier spacing for communications between the UE and a base station, identifying a beam switching capability of the UE associated with the indicated subcarrier spacing, the beam switching capability indicating a threshold quantity of beam switches during a transmission time interval, determining a first quantity of beam switches associated with a first symbol period of the transmission time interval and a second quantity of beam switches associated with remaining symbol periods of the transmission time interval, and determining that the beam switching capability of the UE is satisfied based on comparing the determined first quantity of beam switches and the determined second quantity of beam switches with the indicated threshold quantity of beam switches.

A non-transitory computer-readable medium storing code for wireless communications at a UE is described. The code may include instructions executable by a processor to receive a configuration indicating a subcarrier spacing for communications between the UE and a base station, identify a beam switching capability of the UE associated with the indicated subcarrier spacing, the beam switching capability indicating a threshold quantity of beam switches during a transmission time interval, determine a first quantity of beam switches associated with a first symbol period of the transmission time interval and a second quantity of beam switches associated with remaining symbol periods of the transmission time interval, and determine that the beam switching capability of the UE is satisfied based on comparing the determined first quantity of beam switches and the determined second quantity of beam switches with the indicated threshold quantity of beam switches.

Some examples of the method, apparatuses, and non-transitory computer-readable medium described herein may further include operations, features, means, or instructions for identifying an adjustment parameter associated with the first quantity of beam switches, where determining the first quantity of beam switches associated with the first symbol period may be based on the identified adjustment parameter.

Some examples of the method, apparatuses, and non-transitory computer-readable medium described herein may further include operations, features, means, or instructions for adjusting a value of the first quantity of beam switches based on the identified adjustment parameter.

In some examples of the method, apparatuses, and non-transitory computer-readable medium described herein, adjusting the value of the first quantity of beam switches may include operations, features, means, or instructions for scaling the value of the first quantity of beam switches by the adjustment parameter, subtracting a value of the adjustment parameter from the value of the first quantity of beam switches, or a combination thereof.

Some examples of the method, apparatuses, and non-transitory computer-readable medium described herein may further include operations, features, means, or instructions for transmitting, to the base station, an indication of the adjustment parameter, the beam switching capability, or both.

In some examples of the method, apparatuses, and non-transitory computer-readable medium described herein, the adjustment parameter may be indicated by the beam switching capability of the UE, a pre-configuration of the UE, or a combination thereof.

In some examples of the method, apparatuses, and non-transitory computer-readable medium described herein, determining that the beam switching capability of the UE may be satisfied may include operations, features, means, or instructions for comparing a sum of the first quantity of beam switches associated with the first symbol period and the second quantity of beam switches associated with the remaining symbol periods to the threshold quantity of beam switches, and determining that the sum satisfies the threshold quantity of beam switches.

Some examples of the method, apparatuses, and non-transitory computer-readable medium described herein may further include operations, features, means, or instructions for performing one or more beam switching operations based on determining that the beam switching capability of the UE may be satisfied.

In some examples of the method, apparatuses, and non-transitory computer-readable medium described herein, the first symbol period of the transmission time interval may be located at a boundary between the transmission time interval and a prior transmission time interval.

In some examples of the method, apparatuses, and non-transitory computer-readable medium described herein, a size of the first symbol period may be larger than a size of the remaining symbol periods.

In some examples of the method, apparatuses, and non-transitory computer-readable medium described herein, a first cyclic prefix duration of the first symbol period may be larger than a second cyclic prefix duration of symbol periods of the remaining symbol periods.

A method of wireless communications at a UE is described. The method may include receiving a configuration indicating a subcarrier spacing for communications between the UE and a base station during a transmission time interval, identifying a beam switching capability of the UE associated with the indicated subcarrier spacing, the beam switching capability indicating a threshold quantity of symbol periods between beam switching operations, identifying an adjustment parameter associated with a first symbol period of the transmission time interval, and determining that the beam switching capability of the UE is satisfied based on the first symbol period, a second symbol period of the transmission time interval, the indicated threshold quantity of symbol periods, and the adjustment parameter.

An apparatus for wireless communications at a UE is described. The apparatus may include a processor, memory coupled with the processor, and instructions stored in the memory. The instructions may be executable by the processor to cause the apparatus to receive a configuration indicating a subcarrier spacing for communications between the UE and a base station during a transmission time interval, identify a beam switching capability of the UE associated with the indicated subcarrier spacing, the beam switching capability indicating a threshold quantity of symbol periods between beam switching operations, identify an adjustment parameter associated with a first symbol period of the transmission time interval, and determine that the beam switching capability of the UE is satisfied based on the first symbol period, a second symbol period of the transmission time interval, the indicated threshold quantity of symbol periods, and the adjustment parameter.

Another apparatus for wireless communications at a UE is described. The apparatus may include means for receiving a configuration indicating a subcarrier spacing for communications between the UE and a base station during a transmission time interval, identifying a beam switching capability of the UE associated with the indicated subcarrier spacing, the beam switching capability indicating a threshold quantity of symbol periods between beam switching operations, identifying an adjustment parameter associated with a first symbol period of the transmission time interval, and determining that the beam switching capability of the UE is satisfied based on the first symbol period, a second symbol period of the transmission time interval, the indicated threshold quantity of symbol periods, and the adjustment parameter.

A non-transitory computer-readable medium storing code for wireless communications at a UE is described. The code may include instructions executable by a processor to receive a configuration indicating a subcarrier spacing for communications between the UE and a base station during a transmission time interval, identify a beam switching capability of the UE associated with the indicated subcarrier spacing, the beam switching capability indicating a threshold quantity of symbol periods between beam switching operations, identify an adjustment parameter associated with a first symbol period of the transmission time interval, and determine that the beam switching capability of the UE is satisfied based on the first symbol period, a second symbol period of the transmission time interval, the indicated threshold quantity of symbol periods, and the adjustment parameter.

Some examples of the method, apparatuses, and non-transitory computer-readable medium described herein may further include operations, features, means, or instructions for adjusting the threshold quantity of symbol periods based on the adjustment parameter.

In some examples of the method, apparatuses, and non-transitory computer-readable medium described herein, adjusting the threshold quantity of symbol periods may include operations, features, means, or instructions for scaling a value of the threshold quantity of symbol periods by the adjustment parameter, subtracting a value of the adjustment parameter from the value of the threshold quantity of symbol periods, or a combination thereof.

Some examples of the method, apparatuses, and non-transitory computer-readable medium described herein may further include operations, features, means, or instructions for transmitting, to the base station, an indication of the adjustment parameter, the beam switching capability, or both.

In some examples of the method, apparatuses, and non-transitory computer-readable medium described herein, the adjustment parameter may be indicated by the beam switching capability of the UE, a pre-configuration of the UE, or a combination thereof.

Some examples of the method, apparatuses, and non-transitory computer-readable medium described herein may further include operations, features, means, or instructions for performing a first beam switching operation during the first symbol period of the transmission time interval, and performing a second beam switching operation during the second symbol period of the transmission time interval.

In some examples of the method, apparatuses, and non-transitory computer-readable medium described herein, determining that the beam switching capability of the UE may be satisfied may include operations, features, means, or instructions for comparing a quantity of symbol periods between the first beam switching operation and the second beam switching operation to the threshold quantity of symbol periods or a difference between the threshold quantity of symbol periods and the adjustment parameter.

In some examples of the method, apparatuses, and non-transitory computer-readable medium described herein, the first symbol period of the transmission time interval may be located at a boundary between the transmission time interval and a prior transmission time interval.

In some examples of the method, apparatuses, and non-transitory computer-readable medium described herein, a size of the first symbol period may be larger than a size of remaining symbol periods.

In some examples of the method, apparatuses, and non-transitory computer-readable medium described herein, a first cyclic prefix duration of the first symbol period may be larger than a second cyclic prefix duration of symbol periods of remaining symbol periods.

A method of wireless communications at base station is described. The method may include identifying a beam switching capability of a UE associated with a subcarrier spacing, the beam switching capability indicating a threshold quantity of beam switches during a transmission time interval, determining that the beam switching capability of the UE is satisfied based on comparing a first quantity of beam switches associated with a first symbol period of the transmission time interval and a second quantity of beam switches associated with remaining symbol periods of the transmission time interval with the threshold quantity of beam switches, and transmitting an indication for the UE to perform one or more beam switching operations based on determining that the beam switching capability is satisfied.

An apparatus for wireless communications at base station is described. The apparatus may include a processor, memory coupled with the processor, and instructions stored in the memory. The instructions may be executable by the processor to cause the apparatus to identify a beam switching capability of a UE associated with a subcarrier spacing, the beam switching capability indicating a threshold quantity of beam switches during a transmission time interval, determine that the beam switching capability of the UE is satisfied based on comparing a first quantity of beam switches associated with a first symbol period of the transmission time interval and a second quantity of beam switches associated with remaining symbol periods of the transmission time interval with the threshold quantity of beam switches, and transmit an indication for the UE to perform one or more beam switching operations based on determining that the beam switching capability is satisfied.

Another apparatus for wireless communications at base station is described. The apparatus may include means for identifying a beam switching capability of a UE associated with a subcarrier spacing, the beam switching capability indicating a threshold quantity of beam switches during a transmission time interval, determining that the beam switching capability of the UE is satisfied based on comparing a first quantity of beam switches associated with a first symbol period of the transmission time interval and a second quantity of beam switches associated with remaining symbol periods of the transmission time interval with the threshold quantity of beam switches, and transmitting an indication for the UE to perform one or more beam switching operations based on determining that the beam switching capability is satisfied.

A non-transitory computer-readable medium storing code for wireless communications at base station is described. The code may include instructions executable by a processor to identify a beam switching capability of a UE associated with a subcarrier spacing, the beam switching capability indicating a threshold quantity of beam switches during a transmission time interval, determine that the beam switching capability of the UE is satisfied based on comparing a first quantity of beam switches associated with a first symbol period of the transmission time interval and a second quantity of beam switches associated with remaining symbol periods of the transmission time interval with the threshold quantity of beam switches, and transmit an indication for the UE to perform one or more beam switching operations based on determining that the beam switching capability is satisfied.

Some examples of the method, apparatuses, and non-transitory computer-readable medium described herein may further include operations, features, means, or instructions for identifying an adjustment parameter associated with the first quantity of beam switches, and determining the first quantity of beam switches based on the identified adjustment parameter.

Some examples of the method, apparatuses, and non-transitory computer-readable medium described herein may further include operations, features, means, or instructions for adjusting a value of the first quantity of beam switches based on the identified adjustment parameter.

In some examples of the method, apparatuses, and non-transitory computer-readable medium described herein, adjusting the value of the first quantity of beam switches may include operations, features, means, or instructions for scaling the value of the first quantity of beam switches by the adjustment parameter, subtracting a value of the adjustment parameter from the value of the first quantity of beam switches, or a combination thereof.

Some examples of the method, apparatuses, and non-transitory computer-readable medium described herein may further include operations, features, means, or instructions for receiving, from the UE, an indication of the adjustment parameter, the beam switching capability, or both.

In some examples of the method, apparatuses, and non-transitory computer-readable medium described herein, determining that the beam switching capability of the UE may be satisfied may include operations, features, means, or instructions for comparing a sum of the first quantity of beam switches associated with the first symbol period and the second quantity of beam switches associated with the remaining symbol periods to the threshold quantity of beam switches, and determining that the sum satisfies the threshold quantity of beam switches.

In some examples of the method, apparatuses, and non-transitory computer-readable medium described herein, the first symbol period of the transmission time interval may be located at a boundary between the transmission time interval and a prior transmission time interval.

In some examples of the method, apparatuses, and non-transitory computer-readable medium described herein, a size of the first symbol period may be larger than a size of the remaining symbol periods.

In some examples of the method, apparatuses, and non-transitory computer-readable medium described herein, a first cyclic prefix duration of the first symbol period may be larger than a second cyclic prefix duration of symbol periods of the remaining symbol periods.

A method of wireless communications at a base station is described. The method may include identifying a beam switching capability of a UE associated with a subcarrier spacing, the beam switching capability indicating a threshold quantity of symbol periods between beam switching operations, identifying an adjustment parameter associated with a first symbol period of a transmission time interval, determining the first symbol period for the UE to perform a first beam switching operation and a second symbol period for the UE to perform a second beam switching operation based on the beam switching capability of the UE and the adjustment parameter, and transmitting, to the UE, an indication to perform the first beam switching operation during the first symbol period and to perform the second beam switching operation during the second symbol period.

An apparatus for wireless communications at a base station is described. The apparatus may include a processor, memory coupled with the processor, and instructions stored in the memory. The instructions may be executable by the processor to cause the apparatus to identify a beam switching capability of a UE associated with a subcarrier spacing, the beam switching capability indicating a threshold quantity of symbol periods between beam switching operations, identify an adjustment parameter associated with a first symbol period of a transmission time interval, determine the first symbol period for the UE to perform a first beam switching operation and a second symbol period for the UE to perform a second beam switching operation based on the beam switching capability of the UE and the adjustment parameter, and transmit, to the UE, an indication to perform the first beam switching operation during the first symbol period and to perform the second beam switching operation during the second symbol period.

Another apparatus for wireless communications at a base station is described. The apparatus may include means for identifying a beam switching capability of a UE associated with a subcarrier spacing, the beam switching capability indicating a threshold quantity of symbol periods between beam switching operations, identifying an adjustment parameter associated with a first symbol period of a transmission time interval, determining the first symbol period for the UE to perform a first beam switching operation and a second symbol period for the UE to perform a second beam switching operation based on the beam switching capability of the UE and the adjustment parameter, and transmitting, to the UE, an indication to perform the first beam switching operation during the first symbol period and to perform the second beam switching operation during the second symbol period.

A non-transitory computer-readable medium storing code for wireless communications at a base station is described. The code may include instructions executable by a processor to identify a beam switching capability of a UE associated with a subcarrier spacing, the beam switching capability indicating a threshold quantity of symbol periods between beam switching operations, identify an adjustment parameter associated with a first symbol period of a transmission time interval, determine the first symbol period for the UE to perform a first beam switching operation and a second symbol period for the UE to perform a second beam switching operation based on the beam switching capability of the UE and the adjustment parameter, and transmit, to the UE, an indication to perform the first beam switching operation during the first symbol period and to perform the second beam switching operation during the second symbol period.

Some examples of the method, apparatuses, and non-transitory computer-readable medium described herein may further include operations, features, means, or instructions for adjusting the threshold quantity of symbol periods based on the adjustment parameter.

In some examples of the method, apparatuses, and non-transitory computer-readable medium described herein, adjusting the threshold quantity of symbol periods may include operations, features, means, or instructions for scaling a value of the threshold quantity of symbol periods by the adjustment parameter, subtracting a value of the adjustment parameter from the value of the threshold quantity of symbol periods, or a combination thereof.

Some examples of the method, apparatuses, and non-transitory computer-readable medium described herein may further include operations, features, means, or instructions for receiving, from the UE, an indication of the adjustment parameter, the beam switching capability, or both.

Some examples of the method, apparatuses, and non-transitory computer-readable medium described herein may further include operations, features, means, or instructions for performing the first beam switching operation during the first symbol period of the transmission time interval, and performing the second beam switching operation during the second symbol period of the transmission time interval.

In some examples of the method, apparatuses, and non-transitory computer-readable medium described herein, determining that the beam switching capability of the UE may be satisfied may include operations, features, means, or instructions for comparing a quantity of symbol periods between the first beam switching operation and the second beam switching operation to the threshold quantity of symbol periods or a difference between the threshold quantity of symbol periods and the adjustment parameter.

In some examples of the method, apparatuses, and non-transitory computer-readable medium described herein, the first symbol period of the transmission time interval may be located at a boundary between the transmission time interval and a prior transmission time interval.

In some examples of the method, apparatuses, and non-transitory computer-readable medium described herein, a size of the first symbol period may be larger than a size of remaining symbol periods.

In some examples of the method, apparatuses, and non-transitory computer-readable medium described herein, a first cyclic prefix duration of the first symbol period may be larger than a second cyclic prefix duration of symbol periods of remaining symbol periods.

DETAILED DESCRIPTION

Figure 1:
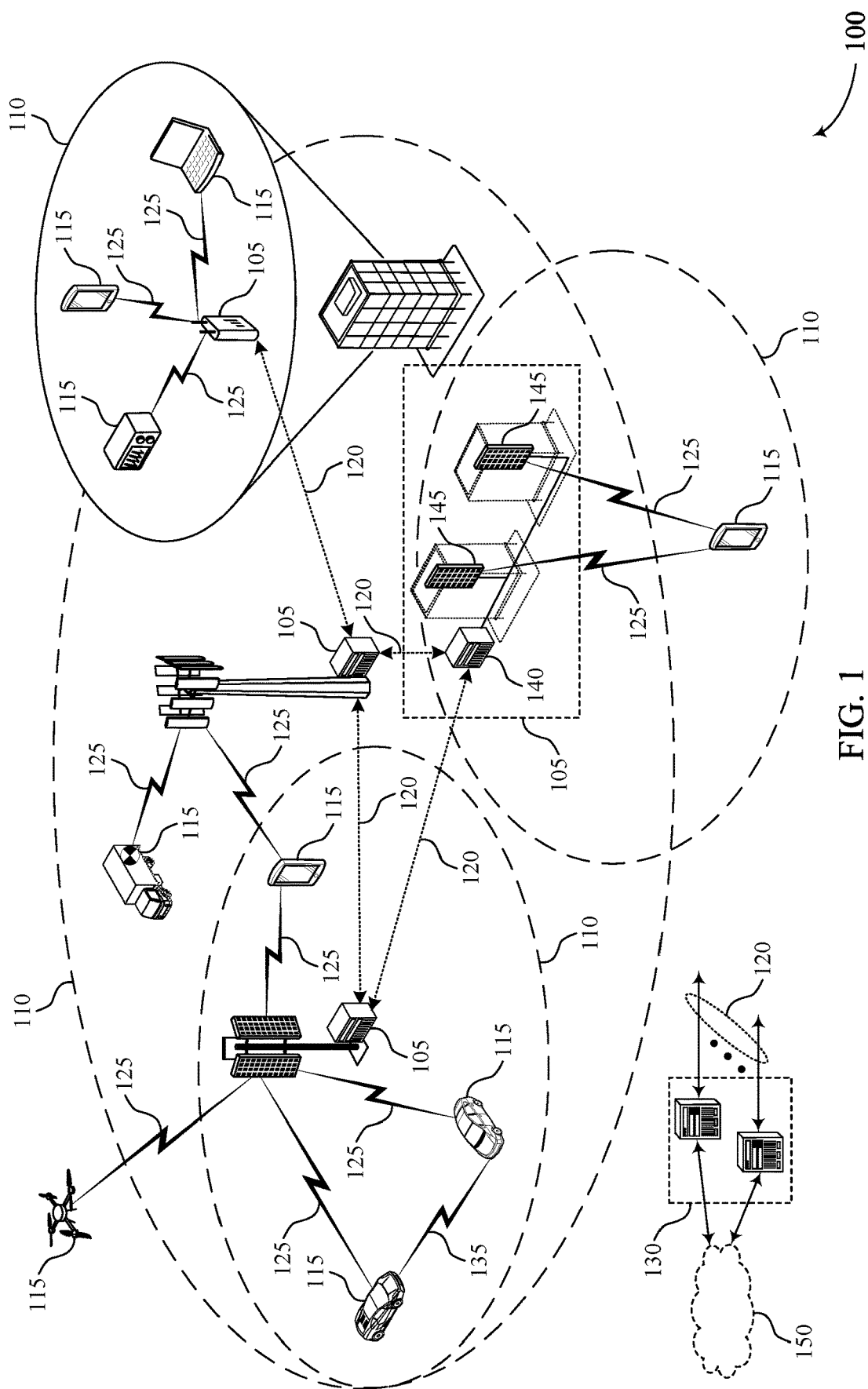
FIG. 1 illustrates an example of a system for wireless communications that supports beam switching operation for systems with high subcarrier spacing in accordance with aspects of the present disclosure.

Devices of a wireless communications system may support beamforming to enhance reliability and efficiency using directional signal transmission. For example, a base station and a user equipment (UE) may communicate using various beam pairs, and the devices may transition between beams during a transmission period. Hardware limitations of UE may increase overhead for beam switching. More particularly, the analog beam switching for a UE may include decoding of control information, reprogramming radio frequency software and/or firmware, retuning radio frequency front ends, etc. These procedures may result in a beam switching delay. Thus, a base station may account for the UE beam switch delay when scheduling resources for communications between the UE and the base station.

Devices in a wireless communications system may operate in various frequency bands and a subcarrier spacing that is used for the communications may depend on the operating frequency band. For example, in high band operations (e.g., ~60 GHz carrier frequency or FR4 design) in new radio (NR) systems, the subcarrier spacing may be increased to limit or prevent phase noise. The subcarrier spacing may also inform an orthogonal frequency division multiplexing (OFDM) symbol length as well as a cyclic prefix length that is positioned between adjacent symbols in a transmission duration. More particularly, as a subcarrier spacing increases, the OFDM symbol length and the cyclic prefix length may decrease (e.g., the OFDM symbol length and the cyclic prefix length inversely scales with the subcarrier spacing). In some subcarrier spacings, the cyclic prefix duration may provide a guard period in which a UE may perform a beam switch between symbol periods. However, with higher subcarrier spacings (and lower OFDM symbol and cyclic prefix lengths), the cyclic prefix may not contain the beam switch delay.

Accordingly, a UE may report a beam switching capability for a subcarrier spacing such that the base station may provide time gaps when scheduling UE communications, which may accommodate the beam switch delay indicated by the UE. In some examples, the beam switching capability reported by the UE may indicate the number of beam switches (N) that a UE can perform per a number of slots (M) for a subcarrier spacing. The indicated number of beam switches (N) may be the number transmission (Tx) beam changes, or reception (Rx) beam changes, or both, and the number of slots may be greater than one. The UE may use these parameters to report the values of N and M. In some examples, the values may be implicitly determined with reference to a reference subcarrier spacing or a reference time duration.

The techniques described herein may enable the devices (e.g., the UE, the base station, or both) to implement one or more beam switching rules, for example, based on the beam switching capability, which may result in improved performance in the wireless communications system. For example, a device may identify the beam switching capability of the UE (e.g., a number of beam switches N that a UE may conduct per a number of slots M, a threshold beam dwell time such as a minimum beam dwell time K between one or more beam switching operations, or both). The device may determine that the beam switching capability of the UE is satisfied based at least in part on the one or more beam switching rules. For example, the device may determine a first quantity of beam switches associated with a first symbol period of a transmission time interval (N1) and a second quantity of beam switches associated with remaining symbol periods of the transmission time interval (N2). In some examples, the first symbol period may be relatively longer than the remaining symbol periods. The device may determine that the beam switching capability is satisfied based on comparing N1 and N2 to a threshold quantity of beam switches (e.g., N) indicated by the beam switching capability of the UE. In some examples, the device may adjust the first quantity of beam switches by an adjustment parameter ($\alpha$). For example, the device may scale N1 by the adjustment parameter, sum the adjustment parameter and N1, subtract the adjustment parameter from N1, among other examples of adjustment operations.

Additionally or alternatively, the device may determine that the capability is satisfied based on comparing a time period between switching operations to a threshold quantity of symbol periods (K). In some examples, the device may adjust a value of K for the first symbol period of the transmission time interval based on an adjustment parameter associated with the first symbol period ($\beta$). For example, the device may scale K for the first period by the adjustment parameter, sum the adjustment parameter and K, subtract the adjustment parameter from K, among other examples of adjustment operations.

Aspects of the disclosure are initially described in the context of wireless communications systems. Aspects of the disclosure are then described in the context of timelines and process flows. Aspects of the disclosure are further illustrated by and described with reference to apparatus diagrams, system diagrams, and flowcharts that relate to beam switching operation for systems with high subcarrier spacing.

FIG. 1 illustrates an example of a wireless communications system 100 that supports beam switching operation for systems with high subcarrier spacing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may report a beam switching capability for a subcarrier spacing such that the base station 105 may provide time gaps when scheduling UE 115 with communications, which may accommodate a beam switch delay indicated by the UE 115. In some examples, the beam switching capability reported by the UE 115 may indicate the number of beam switches (N) that a UE can perform per a number of slots (M) for a subcarrier spacing. The indicated number of beam switches (N) may be the number Tx beam changes, or Rx beam changes, or both, and the number of slots may be greater than one. The UE may use these parameters to report the values of N and M. In some examples, the values may be implicitly determined with reference to a reference subcarrier spacing or a reference time duration.

The techniques described herein may enable the devices (e.g., the UE 115, the base station 105, or both) to implement one or more beam switching rules, for example, based on the beam switching capability, which may result in improved performance in the wireless communications system 100. For example, a device may identify the beam switching capability of the UE 115 (e.g., a number of beam switches N that a UE may conduct per a number of slots M, a minimum beam dwell time (K) between one or more beam switching operations, or both). The device may determine that the beam switching capability of the UE 115 is satisfied based at least in part on the one or more beam switching rules. For example, the device may determine a first quantity of beam switches associated with a first symbol period of a transmission time interval (N1) and a second quantity of beam switches associated with remaining symbol periods of the transmission time interval (N2). In some examples, the first symbol period may be relatively longer than the remaining symbol periods. The device may determine that the beam switching capability is satisfied based on comparing N1 and N2 to a threshold quantity of beam switches (e.g., N) indicated by the beam switching capability of the UE. In some examples, the device may adjust the first quantity of beam switches by an adjustment parameter ($\alpha$). For example, the device may scale N1 by the adjustment parameter, sum the adjustment parameter and N1, subtract the adjustment parameter from N1, among other examples of adjustment operations.

Additionally or alternatively, the device may determine that the capability is satisfied based on comparing a time period between switching operations to a threshold quantity of symbol periods (K). In some examples, the device may adjust a value of K for the first symbol period of the transmission time interval based on an adjustment parameter associated with the first symbol period ($\beta$). For example, the device may scale K for the first period by the adjustment parameter, sum the adjustment parameter and K, subtract the adjustment parameter from K, among other examples of adjustment operations.

Figure 2:
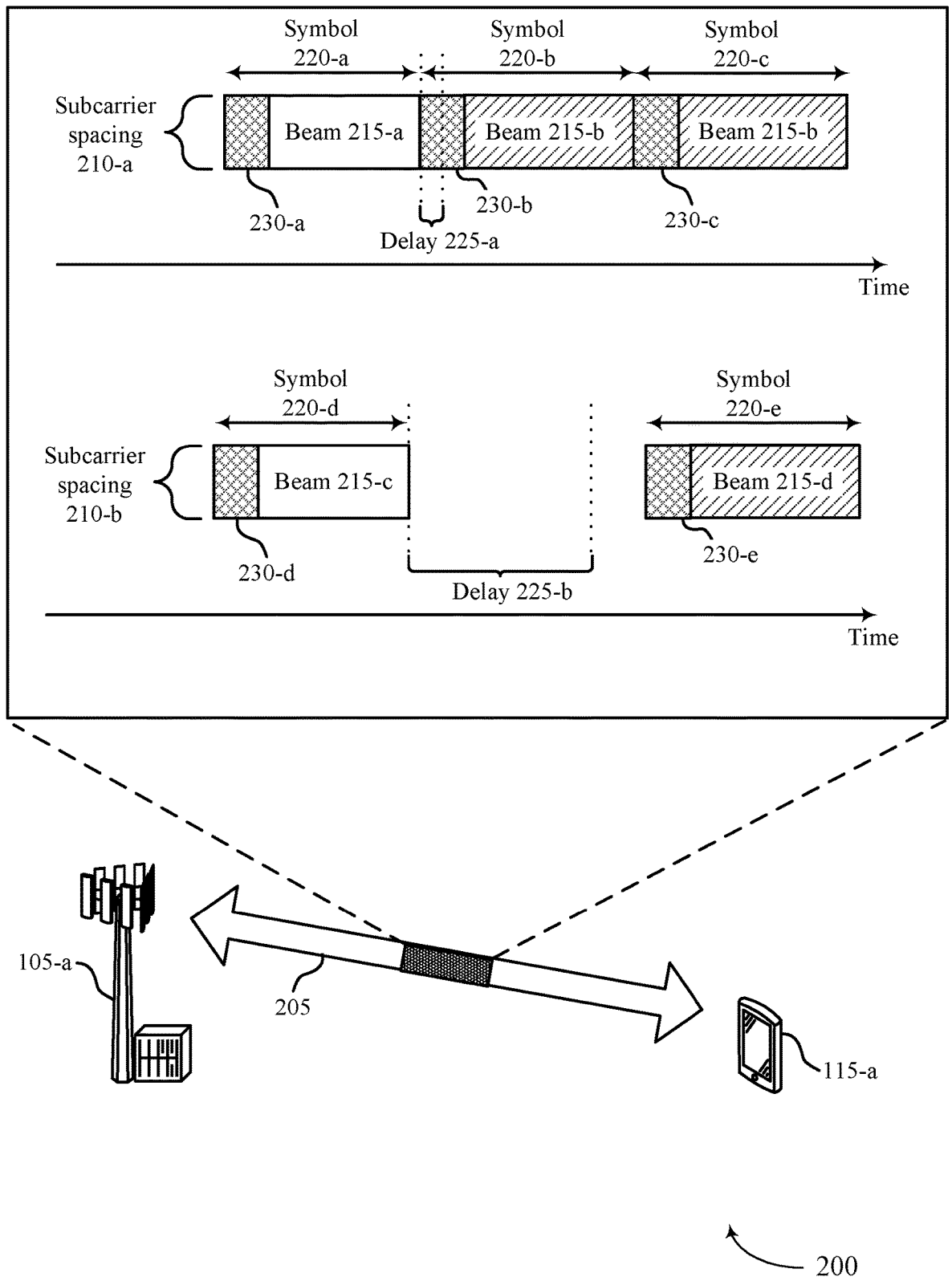
FIG. 2 illustrates an example of a wireless communications system that supports beam switching operation for systems with high subcarrier spacing in accordance with aspects of the present disclosure.

FIG. 2 illustrates an example of a wireless communications system 200 that supports beam switching operation for systems with high subcarrier spacing in accordance with aspects of the present disclosure. In some examples, the wireless communications system 200 may implement aspects of the wireless communications system 100. For example, the wireless communications system 200 may include a UE 115-a and a base station 105-a, which may be examples of the corresponding devices described with reference to FIG. 1. Generally, the wireless communications system 200 may illustrate an example of communications 205 between the UE 115-a and the base station 105-a.

The devices of the wireless communications system 200 may support beamforming to enhance reliability and efficiency using directional signal transmission. In some examples, the base station 105-a may indicate one or more downlink beams 215 (e.g., via transmission configuration indicator (TCI) states configured with quasi-co-location (QCL) Type D properties in NR). For example, the base station 105-a may indicate a TCI state via downlink control information (DCI) or physical downlink control channel (PDCCH). In some examples, the UE 115-a may identify one or more QCL properties based on the default QCL assumptions, for example, if a scheduled offset between a scheduling PDCCH and a scheduled physical downlink shared channel (PDSCH) transmission fails to satisfy a threshold (e.g., the scheduling offset may be less than a threshold time duration). In such examples, the UE 115-a may identify QCL properties for the demodulation reference signal (DMRS) ports of PDSCH communications. As an illustrative example, the QCL properties for the DMRS ports of the PDSCH communications may be the same as the QCL properties used for a CORESET of a lowest identification or identifier (ID) monitored in the latest slot (e.g., a default TCI assumption). In some other examples, the scheduling offset may satisfy (e.g., be greater than or equal to) the threshold and the UE 115-a may determine that the DMRS ports of the PDSCH are QCL with the reference signals (RSs) in the indicated TCI states. In some examples, the threshold value may vary (e.g., different threshold values may be used for cross-carrier scheduling).

The UE 115-a and the base station 105-a may perform communications 205 using various beam pairs, and the devices may transition between beams 215 during a transmission period (e.g., transition between beam 215-a and beam 215-b at the beginning of the delay 225-a). Hardware limitations of the UE 115-a may increase overhead associated with such beam switching. For example, the analog beam switching for the UE 115-a may include decoding of control information, reprogramming radio frequency software and/or firmware, retuning radio frequency front ends, etc. These procedures may result in a beam switching delay 225. Thus, the base station 105-a may account for the beam switch delay 225 when scheduling resources for the communications 205 between the UE 115-a and the base station 105-a. In some examples, the length of a beam switching delay 225 may be based on one or more factors. For example, if one or more parameters are pre-configured (e.g., the beam switching procedures may include a radio frequency front end delay, but may not include decoding control information and reprogramming radio frequency software and/or firmware), the delay 225 may be relatively short in duration.

In some examples, the delay 225 may be included in a duration of a cyclic prefix 230 (e.g., in NR FR2 with 120 kHz subcarrier spacing, among other examples). For example, in the subcarrier spacing 210-a, the delay 225-a associated with switching from the beam 215-a to the beam 215-b may be included in the cyclic prefix 230-b. In such examples, the devices in the wireless communications system may refrain from implementing an additional switching gap (e.g., a longer time period allocated for switching beams, such as a guard time illustrated by the delay 225-b).

In some examples, the devices in the wireless communications system 200 may operate in various frequency bands and a subcarrier spacing 210 that is used for the communications may depend on the operating frequency band. For example, in high band operations (e.g., ~60 GHz carrier frequency or FR4 design) in new radio (NR) systems, a subcarrier spacing 210 may be increased to limit or prevent phase noise. As illustrative examples, a relatively higher subcarrier spacing 210-b may be 960 kHz, 1.92 MHz, 3.84 MHz, etc., although any subcarrier spacing 210 may be used. The subcarrier spacing 210 may also inform a length of a symbol 220 (e.g., an OFDM symbol) as well as a length of a cyclic prefix 230 that is positioned between adjacent symbols 220 in a transmission duration. For example, as a subcarrier spacing 210 increases (e.g., to the relatively higher subcarrier spacing 210-b), the length of a symbol 220 and the length of a cyclic prefix 230 may decrease (e.g., the length of the symbol 220-d and the symbol 220-e, the length of the cyclic prefix 230-d and the cyclic prefix 230-e, or both may inversely scale with the subcarrier spacing 210-b).

As illustrated in the subcarrier spacing 210-a, the duration of a cyclic prefix 230 may provide a guard period in which the UE 115-a may perform a beam switch between symbols 220-a and 220-b. However, as illustrated in the relatively higher subcarrier spacing 210-b, in some examples, the cyclic prefix 230-e may not contain the beam switch delay 225-b. Accordingly, some additional time gaps may be provided between symbols 220-d and 220-e (e.g., an integer quantity of symbols 220 may be inserted between the symbol 220-d and the symbol 220-e in order to satisfy a time threshold for performing a beam switch from the beam 215-c to the beam 215-d). In some examples, the UE 115-a may report a beam switching capability for a subcarrier spacing 210 such that the base station 105-a may provide such time gaps when scheduling the UE 115-a with communications. The beam switching capability reported by the UE 115-a may indicate the number of beam switches that the UE 115-a can perform in one slot for a particular subcarrier spacing 210.

In some examples, the UE 115-a may report a beam switching capability for a subcarrier spacing 210 such that the base station 105-a may provide time gaps when scheduling the UE 115-a with communications, which may accommodate a beam switch delay 225 indicated by the UE 115-a. In some examples, the beam switching capability reported by the UE 115-a may indicate the number of beam switches (N) that the UE 115-a can perform per a number of slots (M) for a subcarrier spacing. The indicated number of beam switches (N) may be the number Tx beam changes, or Rx beam changes, or both, and the number of slots may be greater than one. The UE 115-a may use these parameters to report the values of N and M. In some examples, the values may be implicitly determined with reference to a reference subcarrier spacing 210 or a reference time duration.

The techniques described herein may enable the devices (e.g., the UE 115-a, the base station 105-a, or both) to implement one or more beam switching rules, for example, based on the beam switching capability, which may result in improved performance in the wireless communications system 200. For example, a device may identify the beam switching capability of the UE 115-a (e.g., a number of beam switches N that the UE 115-a may conduct per a number of slots M, a minimum beam dwell time (K) between one or more beam switching operations, or both). The device may determine that the beam switching capability of the UE 115-a is satisfied based at least in part on the one or more beam switching rules. For example, the device may determine a first quantity of beam switches (N1) associated with a first symbol 220 of a transmission time interval and a second quantity of beam switches (N2) associated with remaining symbols 220 of the transmission time interval. In some examples, the first symbol period may be relatively longer than the remaining symbols 220. The device may determine that the beam switching capability is satisfied based on comparing N1 and N2 to a threshold quantity of beam switches (e.g., N) indicated by the beam switching capability of the UE 115-a. In some examples, the device may adjust the first quantity of beam switches by an adjustment parameter ($\alpha$). For example, the device may scale N1 by the adjustment parameter, sum the adjustment parameter and N1, subtract the adjustment parameter from N1, among other examples of adjustment operations.

Additionally or alternatively, the device may determine that the capability is satisfied based on comparing a time period between switching operations to a threshold quantity of symbols 220 (K). In some examples, the device may adjust a value of K for the first symbol 220 of the transmission time interval based on an adjustment parameter ($\beta$) associated with the first symbol 220. For example, the device may scale K for the first symbol 220 by the adjustment parameter, sum the adjustment parameter and K, subtract the adjustment parameter from K, among other examples of adjustment operations.

Figure 3:
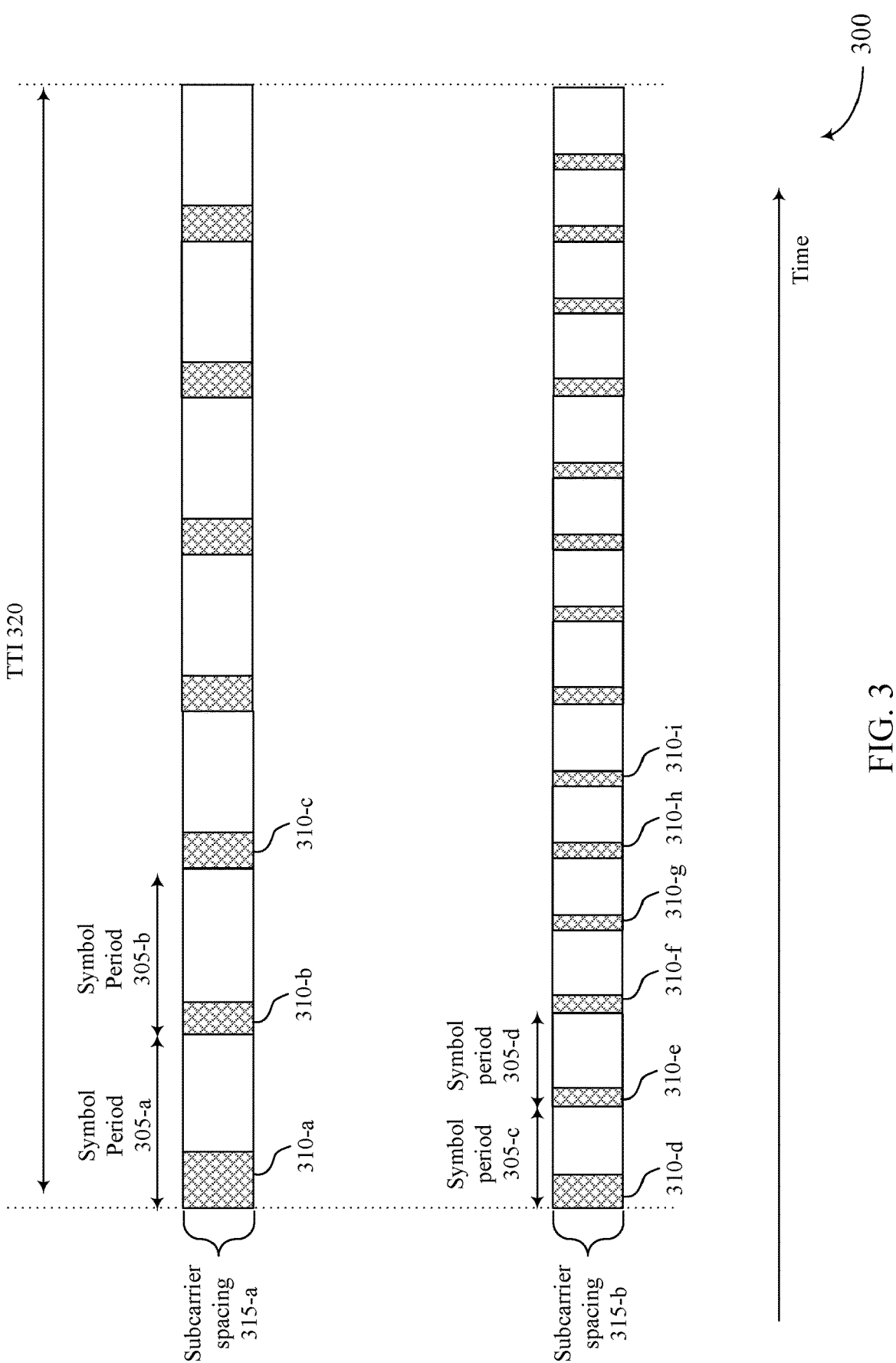
FIG. 3 illustrates an example of a timeline that supports beam switching operation for systems with high subcarrier spacing in accordance with aspects of the present disclosure.

FIG. 3 illustrates an example of a timeline 300 that supports beam switching operation for systems with high subcarrier spacing in accordance with aspects of the present disclosure. In some examples, the timeline 300 may implement aspects of wireless communications systems 100 and 200. For example, the timeline 300 may illustrate communications between a UE 115 and a base station 105 as described herein.

For example, the timeline 300 may illustrate an example of two subcarrier spacings 315 (e.g., a relatively lower subcarrier spacing 315-a and a relatively higher subcarrier spacing 315-b) during a TTI 320 (e.g., a subframe, a half-subframe, a time period such as 0.5 ms, etc.). In some examples, the timeline 300 may illustrate an example of an NR slot structure with subcarrier spacing adjustment (e.g., scaling). For example, the timeline 300 may illustrate symbol-level alignment across different subcarrier spacings 315 with a same cyclic prefix 310 overhead. Although the subcarrier spacing 315-a and the subcarrier spacing 315-b may be shown as including seven symbol periods 305 and fourteen symbol periods 305, respectively, for illustrative clarity, it is to be understood that the TTI 320 may include any quantity of slots, symbol periods 305, cyclic prefixes 310, etc., in accordance with one or more subcarrier spacing schemes.

As an illustrative example, the subcarrier spacing 315-a may be illustrative of a 15 kHz subcarrier spacing configuration, the TTI 320 may be an example of a half-subframe, the TTI 320 may include seven symbol periods 305, and the TTI 320 may include a half slot, although it is to be understood that any subcarrier spacing configuration may be represented by the subcarrier spacing 315-a (e.g., a 30 kHz subcarrier spacing configuration, a 60 kHz subcarrier spacing configuration, a 120 kHz subcarrier spacing configuration, etc.). As another illustrative example, the subcarrier spacing 315-b may be illustrative of a 30 kHz subcarrier spacing configuration, the TTI 320 may be an example of a half-subframe, the TTI 320 may include fourteen symbol periods 305, and the TTI 320 may include one slot, although it is to be understood that any subcarrier spacing configuration may be represented by the subcarrier spacing 315-a (e.g., a 15 kHz subcarrier spacing configuration, a 60 kHz subcarrier spacing configuration with a TTI 320 including two slots, a 120 kHz subcarrier spacing configuration with a TTI 320 including four slots, etc.).

In some examples, the first symbol period 305-a of the TTI 320 may be relatively longer than other symbol periods 305 (e.g., the symbol period 305-b) in the TTI 320. For example, the first symbol period 305-a may be on a boundary between the TTI 320 and another TTI 320, and may include a relatively longer cyclic prefix 310-a compared to other cyclic prefixes 310 (e.g., the cyclic prefix 310-b, the cyclic prefix 310-c, or other examples of cyclic prefixes 310) in the rest of the TTI 320, which may result in the symbol period 305-a or the symbol period 305-c being relatively longer than other symbol periods 305 in the TTI 320 (e.g., the symbol period 305-a and the symbol period 305-c may be relatively longer than the symbol periods 305-b and 305-d, respectively).

In some examples, a UE 115 may report a beam switching capability (e.g., in radio resource control (RRC) signaling, such as in a UE capability report) for a subcarrier spacing 315 such that a base station 105 may provide time gaps when scheduling the UE 115 with communications, which may accommodate a beam switch delay indicated by the UE 115. In some examples, the beam switching capability reported by the UE 115 may indicate the number of beam switches (N) that a UE can perform per a number of slots (M) for a subcarrier spacing 315. The indicated number of beam switches (N) may be the number Tx beam changes, or Rx beam changes, or both, and the number of slots may be greater than one. The UE 115 may use these parameters to report the values of N and M. In some examples, the values may be implicitly determined with reference to a reference subcarrier spacing 315 or a reference time duration. However, in some cases, the slot structure of the timeline 300 may result in relatively inefficient beam switching operations. For example, the beam switching capability of the UE 115 (e.g., N beam switches per M slots, a minimum beam dwell time K between beam switch operations) may fail to account for the relatively longer first time period (e.g., the symbol period 305-a or the symbol period 305-c). Accordingly, the techniques described herein may provide devices with one or more beam switching rules to account for such slot structures, which may enable devices to perform one or more additional beam switching operations during the relatively longer symbol periods 305 while still satisfying the beam switching capability of the UE 115. For example, due to the cyclic prefix 310-d being relatively longer, the cyclic prefix 310-d may be long enough to include a beam switching delay which may enable the UE 115 to utilize a relatively shorter or no additional beam switching gap (e.g., in units of symbol periods 305) during the first symbol period 305-c compared to the other symbol periods 305 in the TTI 320. Such techniques may support improvements in the beamforming communication framework, decrease signaling overhead, and improve reliability, among other advantages. As such, supported techniques may include improved network operations and, in some examples, may promote network efficiencies, among other benefits.

A device may identify the beam switching capability of the UE 115 (e.g., a number of beam switches N that a UE may conduct per a number of slots M, a minimum beam dwell time (K) between one or more beam switching operations, or both). The device may determine that the beam switching capability of the UE 115 is satisfied based at least in part on the one or more beam switching rules. For example, the device may determine a first quantity of beam switches associated with a first symbol period of a transmission time interval (N1) and a second quantity of beam switches associated with remaining symbol periods of the transmission time interval (N2). In some examples, the first symbol period may be relatively longer than the remaining symbol periods. The device may determine that the beam switching capability is satisfied based on comparing N1 and N2 to a threshold quantity of beam switches (e.g., N) indicated by the beam switching capability of the UE. In some examples, the device may adjust the first quantity of beam switches by an adjustment parameter ($\alpha$). For example, the device may scale N1 by the adjustment parameter, sum the adjustment parameter and N1, subtract the adjustment parameter from N1, among other examples of adjustment operations.

Additionally or alternatively, the device may determine that the capability is satisfied based on comparing a time period between switching operations to a threshold quantity of symbol periods (K). In some examples, the device may adjust a value of K for the first symbol period of the transmission time interval based on an adjustment parameter associated with the first symbol period ($\beta$). For example, the device may scale K for the first period by the adjustment parameter, sum the adjustment parameter and K, subtract the adjustment parameter from K, among other examples of adjustment operations.

Figure 4:
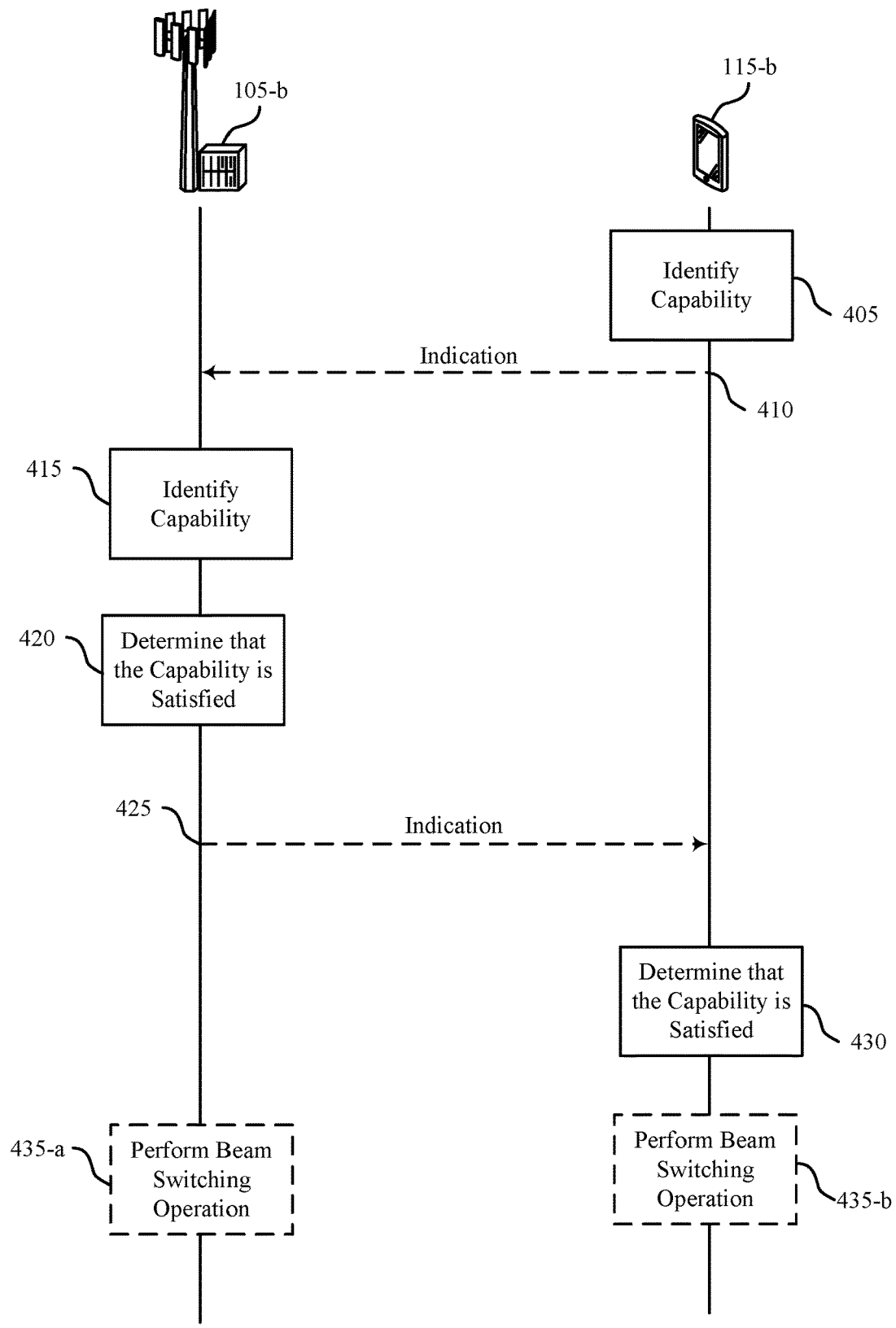
FIG. 4 illustrates an example of a process flow that supports beam switching operation for systems with high subcarrier spacing in accordance with aspects of the present disclosure.

FIG. 4 illustrates an example of a process flow 400 that supports beam switching operation for systems with high subcarrier spacing in accordance with aspects of the present disclosure. In some examples, the process flow 400 may implement aspects of wireless communications systems 100 and 200, the timeline 300, or any combination thereof as described with reference to FIGS. 1-3. Generally, the process flow 400 may illustrate the use of one or more beam switching rules by one or more devices (e.g., a UE 115-*b* and a base station 105-*b*), although it is to be understood that the operations shown in the process flow 400 may be performed in a different order, operations performed at one device may be performed at another device, some operations may be removed, or additional operations may be performed.

At 405, the UE 115-*b* may identify a capability. The capability may be an example of a beam switching capability of the UE 115-*b* as described herein. For example, the beam switching capability may indicate the number of beam switches (N) that the UE 115-*b* can perform per a number of slots (M) for a subcarrier spacing. The indicated number of beam switches (N) may be the number Tx beam changes, or Rx beam changes, or both, and the number of slots may be greater than one. The UE may use these parameters to report the values of N and M. In some examples, the values may be implicitly determined with reference to a reference subcarrier spacing or a reference time duration. Additionally or alternatively, the beam switching capability may indicate a beam dwell time (K) between one or more beam switching operations (e.g., a minimum time period that the UE 115-*b* may use a particular beam before being available to perform a beam switching operation to another beam).

In some examples, at 410 the UE 115-*b* may indicate the capability to the base station 105-*b* (e.g., via a capability reporting mechanism). For example, the UE 115-*b* may send assistance information feedback indicating one or more parameters of the capability (e.g., an adjustment parameter, one or more thresholds, etc.). At 415, the base station 105-*b* may identify the capability of the UE 115-*b*, for example, based on the indication from the UE 115-*b*, based on one or more preconfigured parameters at the base station 105-*b*, or a combination thereof.

At 420, the base station 105-*b* may determine that the capability is satisfied in accordance with one or more beam switching rules. For example, in a first beam switching rule, the base station 105-*b* may determine that a quantity of scheduled beam switches satisfies a threshold quantity of beam switches indicated by the capability of the UE 115-*b* (e.g., N beam switches per M slots). In such examples, the base station 105-*b* may determine one or more quantities of beam switches. For example, the base station 105-*b* may determine a first number of beam switches (N1) for the UE 115-*b* to perform during a first symbol period of a transmission time interval (e.g., a symbol on a boundary between transmission time intervals) and a second number of beam switches (N2) for the UE 115-*b* to perform during other symbol periods of a transmission time interval. The base station 105-*b* may compare N1 and N2 to the capability (e.g., N) to determine whether the capability is satisfied.

In some examples, the base station 105-*b* may implement one or more adjustment parameters to determine the quantities of beam switches. For example, the base station 105-*b* may identify an adjustment parameter α associated with the first symbol period of the transmission time interval (e.g., a may correspond to N1). The base station 105-*b* may adjust a value of the number of beam switches N1 using the adjustment parameter α prior to determining that the total quantity of scheduled beam switches satisfies a threshold N. As an illustrative example, a may be a value between 0 and 1 and may be a scaling parameter applied to the number of beam switches N1 prior to comparing the sum of N1 and N2 to the threshold N. In other words, the base station 105-*b* may use the following equation as a rule to determine whether the capability of the UE 115-*b* is satisfied: αN1+N2≤N. Additionally or alternatively, a may be implemented in other adjustment operations. For example, one or more adjustment parameter (e.g., α) may be added to, subtracted from, scaled, or any combination thereof to N1 and/or N2 prior to comparing the sum of N1 and N2 to N. As an illustrative example, the base station 105-*b* may use the following equation as a rule to determine whether the capability of the UE 115-*b* is satisfied: max(0,N1−α)+N2≤N. Such adjustment operations may enable the base station 105-*b* to configure a relatively higher number of beam switching operations (e.g., when a is a scaling parameter less than 1) during the first symbol period of the TTI while still satisfying the capability of the UE 115-*b*. As an illustrative example, if the threshold quantity of beam switches N is 4, the quantity of beam switches in the remaining symbol period of the transmission time interval is 3, and a is identified to be 0.5, then the UE 115-*a* may be enabled to perform 2 beam switching operations during the first symbol period (e.g., N1 may be 2 in order to satisfy the equation αN1+N2≤N, or in this case, (0.5)*2+3≤4 is satisfied).

In some examples, identifying the adjustment parameter α may be based on the capability of the UE 115-*b*, assistance information feedback associated with the UE 115-*b*, or a combination thereof. In some examples, (e.g., when the capability of the UE 115-*b* does not include an indication of the adjustment parameter α) the base station 105-*b* may use a configured value for the adjustment parameter α (e.g., α=1 may be a default value, among other examples).

Additionally or alternatively, the base station 105-*b* may implement a second beam switching rule. For example, the base station 105-*b* may determine a threshold time period between switching operations (e.g., a minimum beam dwell time K). The base station 105-*b* may implement one or more adjustment parameters to determine whether one or more scheduled beam switches satisfy the threshold time period. For example, the base station 105-*b* may identify an adjustment parameter β (e.g., based on the capability of the UE 115-*b*, assistance information feedback associated with the UE 115-*b*, a pre-configured value, or any combination thereof). The base station 105-*b* may apply the adjustment parameter β to a spacing (e.g., in time such as in units of OFDM symbols) between beam switching operations that may occur in the first symbol period of a transmission time interval. As an illustrative example, β may be a value greater or equal to zero and may be applied to the threshold time period (e.g., K symbols) prior to determining whether a scheduled gap between beam switching operations satisfies the capability of the UE 115-*b*. (e.g., the base station 105-*b* may use the equation K−β and compare a result of the equation to the scheduled gap between beam transmissions in the first symbol period of the transmission time interval, and use the value of K for the remaining symbol periods of the transmission time interval). In some examples, one or more adjustment parameter (e.g., β) may be added to, subtracted from, scaled, or any combination thereof to K prior to determining that the capability of the UE 115-*b* is satisfied. Such adjustment operations may enable the base station 105-*b* to configure a relatively higher number of beam switching operations during the first symbol period of the TTI while still satisfying the capability of the UE 115-*b*, which may result in more efficient system performance.

In some examples, identifying the adjustment parameter β may be based on the capability of the UE 115-*b*, assistance information feedback associated with the UE 115-*b*, or a combination thereof. In some examples, (e.g., when the capability of the UE 115-*b* does not include an indication of the adjustment parameter β) the base station 105-*b* may use a configured value for the adjustment parameter β (e.g., (=0 may be a default value, among other examples).

In some examples, at 425 the base station 105-*b* may transmit an indication to the UE 115-*b* to perform one or more beam switching operations based on determining that the capability of the UE 115-*b* is satisfied.

At 430, the UE 115-*b* may determine that the capability is satisfied as described herein, for example, with reference to 420 (e.g., based on one or more beam switching rules, equations, parameters, etc.).

In some examples, at 435-*a* the base station 105-*b* may perform one or more beam switching operations in accordance with the beam switching rules described herein. For example, the base station 105-*b* may conduct a first beam switching operation at a first time period and a second beam switching operation at a second time period, where a gap between the first time period and the second time period satisfies one or more thresholds and rules as discussed herein (e.g., K, a difference between K and β, etc.), and/or where one or more quantities of beam switching operations satisfy a threshold (e.g., N1, N2, and one or more adjustment parameters are determined to satisfy N).

In some examples, at 435-*b* the UE 115-*b* may perform one or more beam switching operations in accordance with the beam switching rules described herein. For example, the UE 115-*b* may conduct a first beam switching operation at a first time period and a second beam switching operation at a second time period, where a gap between the first time period and the second time period satisfies one or more thresholds and rules as discussed herein (e.g., K, a difference between K and β, etc.), and/or where one or more quantities of beam switching operations satisfy a threshold (e.g., N1, N2, and one or more adjustment parameters are determined to satisfy N).

Figure 5:
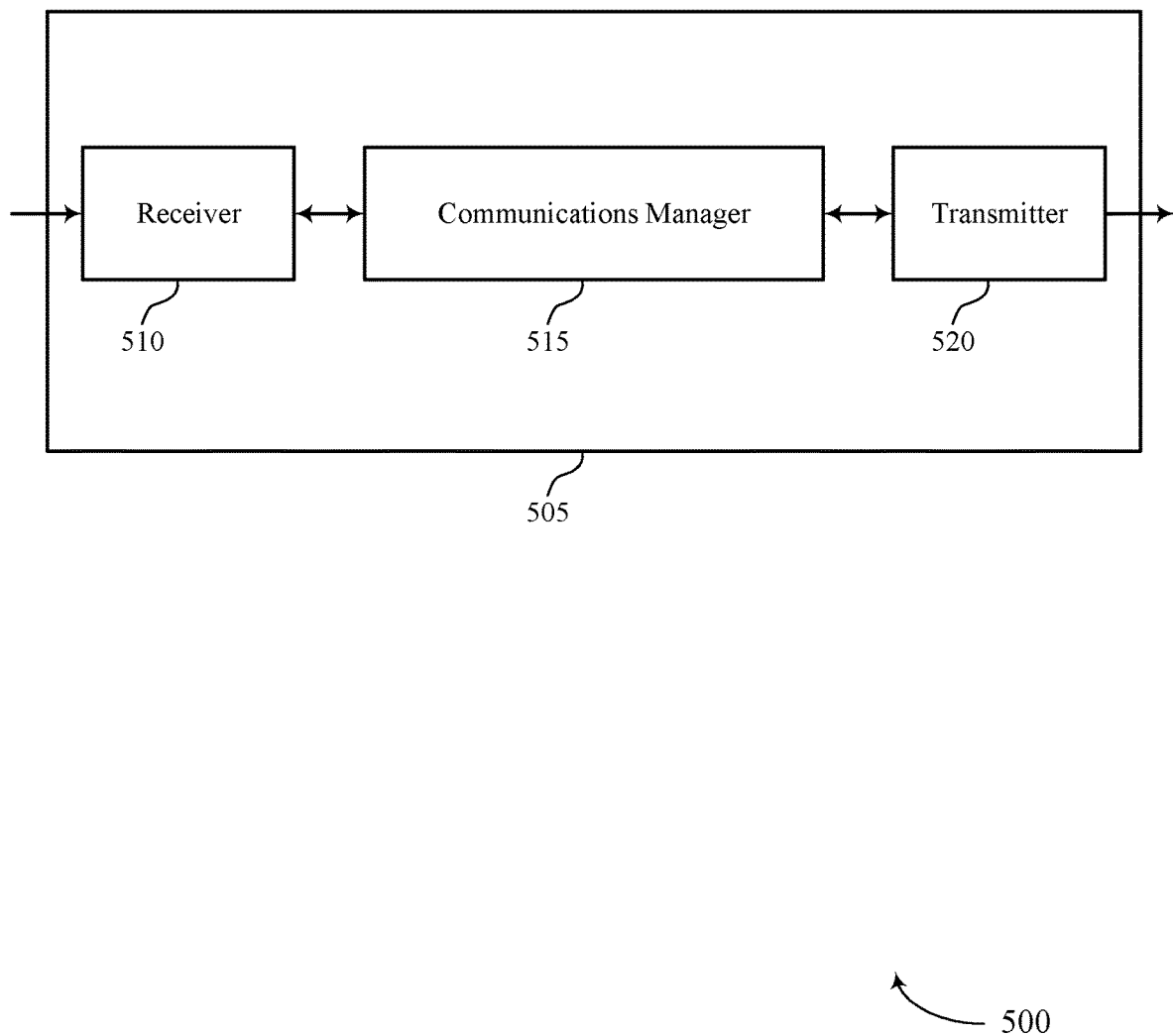
FIGS. 5 and 6 show block diagrams of devices that support beam switching operation for systems with high subcarrier spacing in accordance with aspects of the present disclosure.

FIG. 5 shows a block diagram 500 of a device 505 that supports beam switching operation for systems with high subcarrier spacing in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam switching operation for systems with high subcarrier spacing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration indicating a subcarrier spacing for communications between the UE and a base station, identify a beam switching capability of the UE associated with the indicated subcarrier spacing, the beam switching capability indicating a threshold quantity of beam switches during a transmission time interval, determine that the beam switching capability of the UE is satisfied based on comparing the determined first quantity of beam switches and the determined second quantity of beam switches with the indicated threshold quantity of beam switches, and determine a first quantity of beam switches associated with a first symbol period of the transmission time interval and a second quantity of beam switches associated with remaining symbol periods of the transmission time interval. The communications manager 515 may also receive a configuration indicating a subcarrier spacing for communications between the UE and a base station during a transmission time interval, identify a beam switching capability of the UE associated with the indicated subcarrier spacing, the beam switching capability indicating a threshold quantity of symbol periods between beam switching operations, determine that the beam switching capability of the UE is satisfied based on the first symbol period, a second symbol period of the transmission time interval, the indicated threshold quantity of symbol periods, and the adjustment parameter, and identify an adjustment parameter associated with a first symbol period of the transmission time interval. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. For example, the communications manager 515 may implement one or more beam switching rules as described herein, which may enable the UE to perform one or more additional beam switching operations during a symbol period while still satisfying a capability of the UE, reduce or eliminate an additional time (e.g., quantity of symbols) between beam switching operations, or a combination thereof. Such operations may increase system performance and communication efficiency.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
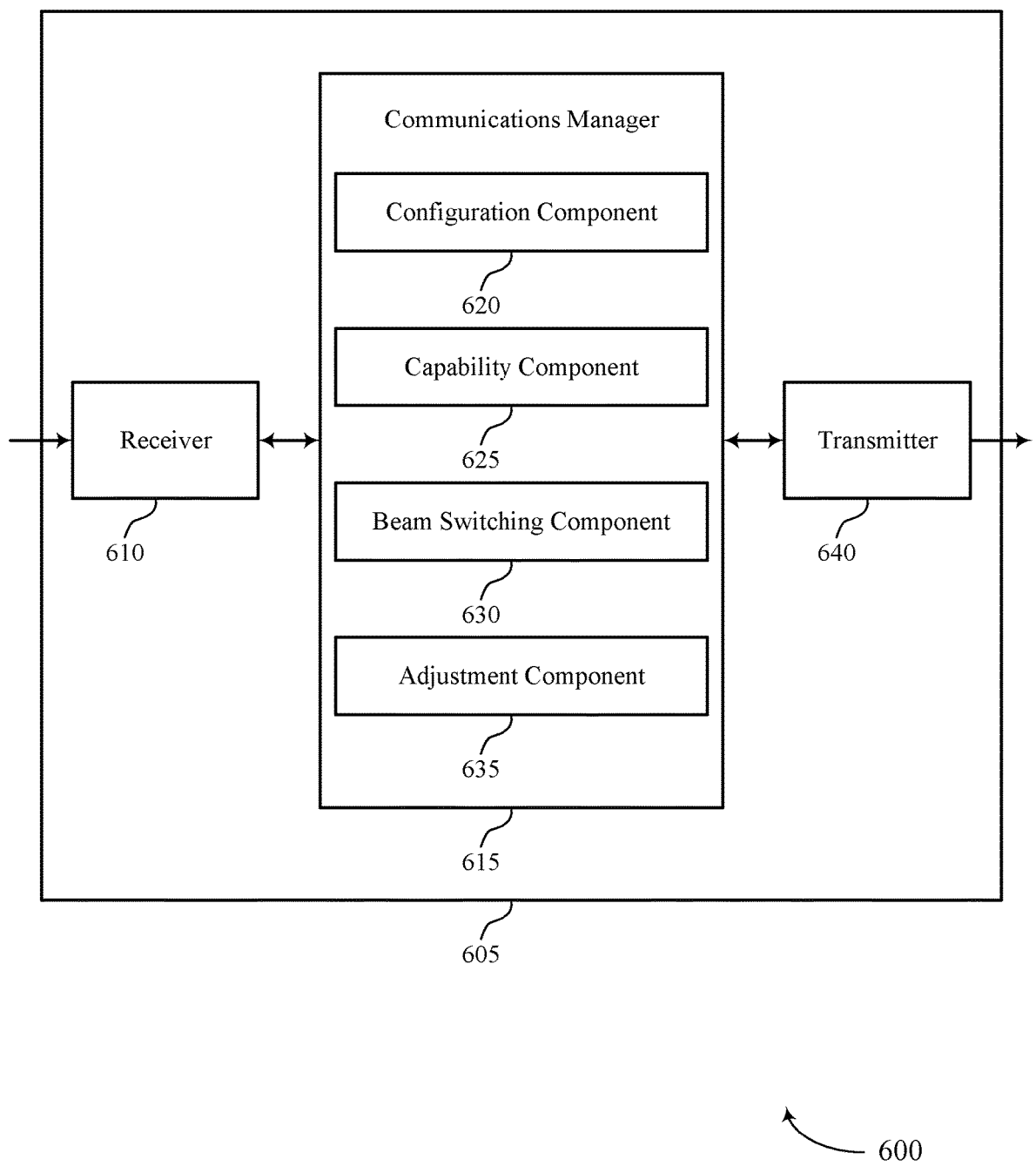

FIG. 6 shows a block diagram 600 of a device 605 that supports beam switching operation for systems with high subcarrier spacing in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to beam switching operation for systems with high subcarrier spacing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration component 620, a capability component 625, a beam switching component 630, and an adjustment component 635. The communications manager 615 may be an example of aspects of the communications manager 810 described herein.

The configuration component 620 may receive a configuration indicating a subcarrier spacing for communications between the UE and a base station. The capability component 625 may identify a beam switching capability of the UE associated with the indicated subcarrier spacing, the beam switching capability indicating a threshold quantity of beam switches during a transmission time interval and determine that the beam switching capability of the UE is satisfied based on comparing the determined first quantity of beam switches and the determined second quantity of beam switches with the indicated threshold quantity of beam switches. The beam switching component 630 may determine a first quantity of beam switches associated with a first symbol period of the transmission time interval and a second quantity of beam switches associated with remaining symbol periods of the transmission time interval.

The configuration component 620 may receive a configuration indicating a subcarrier spacing for communications between the UE and a base station during a transmission time interval. The capability component 625 may identify a beam switching capability of the UE associated with the indicated subcarrier spacing, the beam switching capability indicating a threshold quantity of symbol periods between beam switching operations and determine that the beam switching capability of the UE is satisfied based on the first symbol period, a second symbol period of the transmission time interval, the indicated threshold quantity of symbol periods, and the adjustment parameter. The adjustment component 635 may identify an adjustment parameter associated with a first symbol period of the transmission time interval.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
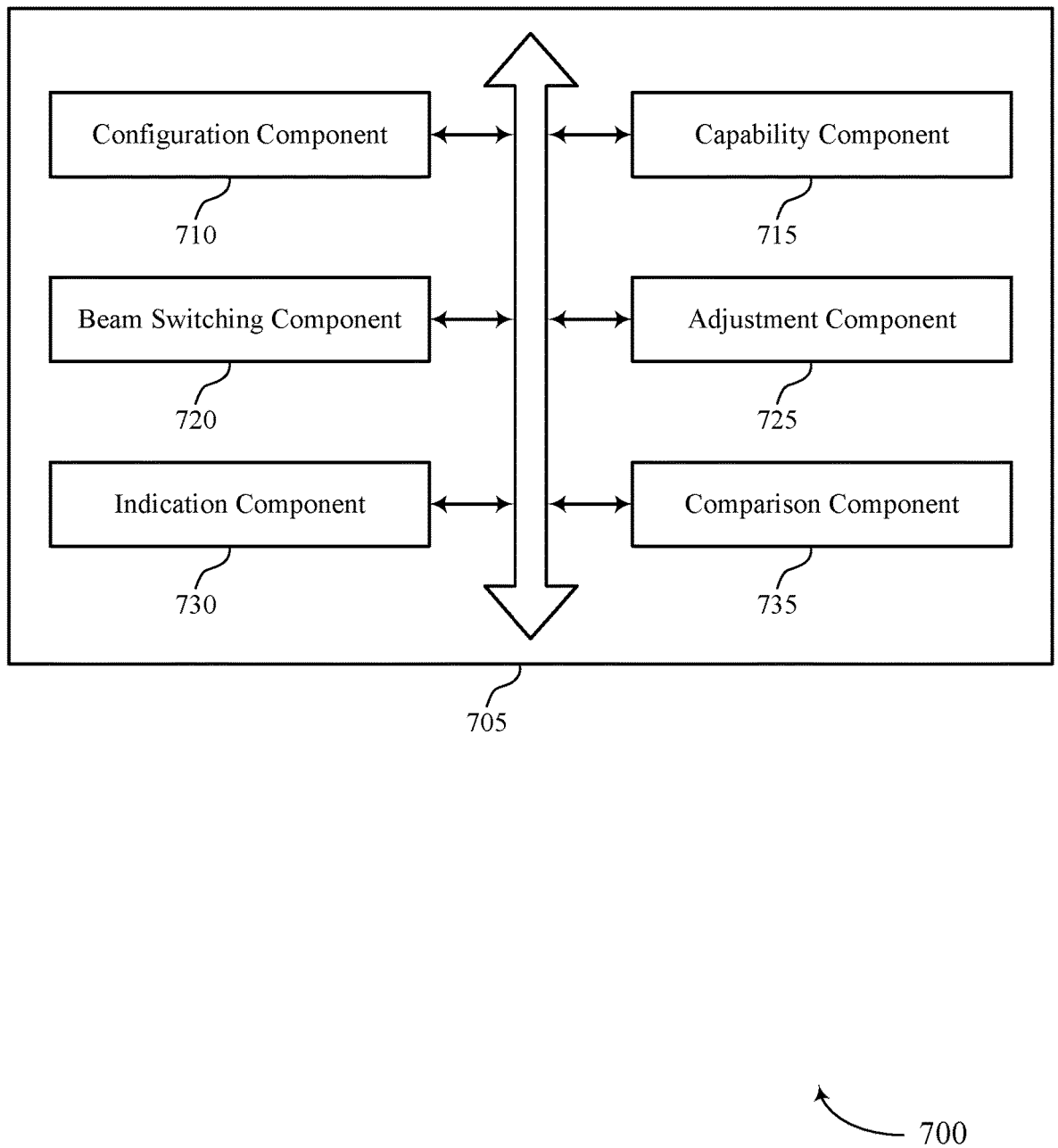
FIG. 7 shows a block diagram of a communications manager that supports beam switching operation for systems with high subcarrier spacing in accordance with aspects of the present disclosure.

FIG. 7 shows a block diagram 700 of a communications manager 705 that supports beam switching operation for systems with high subcarrier spacing in accordance with aspects of the present disclosure. The communications manager 705 may be an example of aspects of a communications manager 515, a communications manager 615, or a communications manager 810 described herein. The communications manager 705 may include a configuration component 710, a capability component 715, a beam switching component 720, an adjustment component 725, an indication component 730, and a comparison component 735. Each of these modules may communicate, directly or indirectly, with one another (e.g., via one or more buses).

The configuration component 710 may receive a configuration indicating a subcarrier spacing for communications between the UE and a base station. In some examples, the configuration component 710 may receive a configuration indicating a subcarrier spacing for communications between the UE and a base station during a transmission time interval.

The capability component 715 may identify a beam switching capability of the UE associated with the indicated subcarrier spacing, the beam switching capability indicating a threshold quantity of beam switches during a transmission time interval. In some examples, the capability component 715 may determine that the beam switching capability of the UE is satisfied based on comparing the determined first quantity of beam switches and the determined second quantity of beam switches with the indicated threshold quantity of beam switches.

In some examples, the capability component 715 may identify a beam switching capability of the UE associated with the indicated subcarrier spacing, the beam switching capability indicating a threshold quantity of symbol periods between beam switching operations. In some examples, the capability component 715 may determine that the beam switching capability of the UE is satisfied based on the first symbol period, a second symbol period of the transmission time interval, the indicated threshold quantity of symbol periods, and the adjustment parameter.

In some cases, the first symbol period of the transmission time interval is located at a boundary between the transmission time interval and a prior transmission time interval. In some cases, a size of the first symbol period is larger than a size of the remaining symbol periods. In some cases, a first cyclic prefix duration of the first symbol period is larger than a second cyclic prefix duration of symbol periods of the remaining symbol periods.

The beam switching component 720 may determine a first quantity of beam switches associated with a first symbol period of the transmission time interval and a second quantity of beam switches associated with remaining symbol periods of the transmission time interval. In some examples, the beam switching component 720 may perform one or more beam switching operations based on determining that the beam switching capability of the UE is satisfied.

In some examples, the beam switching component 720 may perform a first beam switching operation during the first symbol period of the transmission time interval. In some examples, the beam switching component 720 may perform a second beam switching operation during the second symbol period of the transmission time interval. In some cases, the first symbol period of the transmission time interval is located at a boundary between the transmission time interval and a prior transmission time interval. In some cases, a size of the first symbol period is larger than a size of the remaining symbol periods. In some cases, a first cyclic prefix duration of the first symbol period is larger than a second cyclic prefix duration of symbol periods of the remaining symbol periods.

The adjustment component 725 may identify an adjustment parameter associated with a first symbol period of the transmission time interval. In some examples, the adjustment component 725 may identify an adjustment parameter associated with the first quantity of beam switches, where determining the first quantity of beam switches associated with the first symbol period is based on the identified adjustment parameter.

In some examples, the adjustment component 725 may adjust a value of the first quantity of beam switches based on the identified adjustment parameter. In some examples, the adjustment component 725 may scale the value of the first quantity of beam switches by the adjustment parameter, subtracting a value of the adjustment parameter from the value of the first quantity of beam switches, or a combination thereof.

In some examples, the adjustment component 725 may adjust the threshold quantity of symbol periods based on the adjustment parameter. In some examples, the adjustment component 725 may scale a value of the threshold quantity of symbol periods by the adjustment parameter, subtracting a value of the adjustment parameter from the value of the threshold quantity of symbol periods, or a combination thereof.

In some cases, the adjustment parameter is indicated by the beam switching capability of the UE, a pre-configuration of the UE, or a combination thereof.

The indication component 730 may transmit, to the base station, an indication of the adjustment parameter, the beam switching capability, or both.

The comparison component 735 may compare a sum of the first quantity of beam switches associated with the first symbol period and the second quantity of beam switches associated with the remaining symbol periods to the threshold quantity of beam switches. In some examples, the comparison component 735 may determine that the sum satisfies the threshold quantity of beam switches.

In some examples, the comparison component 735 may compare a quantity of symbol periods between the first beam switching operation and the second beam switching operation to the threshold quantity of symbol periods or a difference between the threshold quantity of symbol periods and the adjustment parameter.

Figure 8:
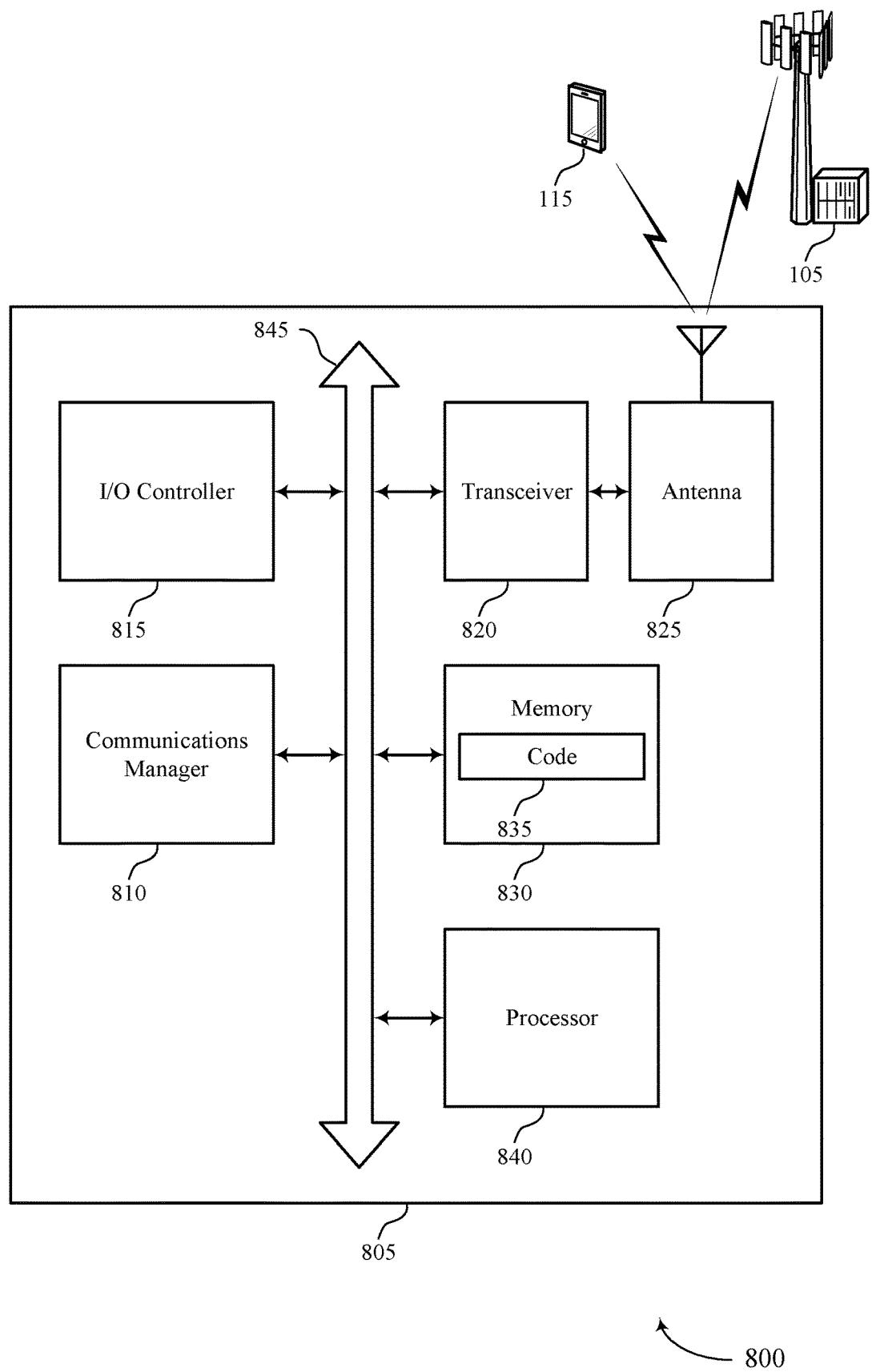
FIG. 8 shows a diagram of a system including a device that supports beam switching operation for systems with high subcarrier spacing in accordance with aspects of the present disclosure.

FIG. 8 shows a diagram of a system 800 including a device 805 that supports beam switching operation for systems with high subcarrier spacing in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration indicating a subcarrier spacing for communications between the UE and a base station, identify a beam switching capability of the UE associated with the indicated subcarrier spacing, the beam switching capability indicating a threshold quantity of beam switches during a transmission time interval, determine that the beam switching capability of the UE is satisfied based on comparing the determined first quantity of beam switches and the determined second quantity of beam switches with the indicated threshold quantity of beam switches, and determine a first quantity of beam switches associated with a first symbol period of the transmission time interval and a second quantity of beam switches associated with remaining symbol periods of the transmission time interval. The communications manager 810 may also receive a configuration indicating a subcarrier spacing for communications between the UE and a base station during a transmission time interval, identify a beam switching capability of the UE associated with the indicated subcarrier spacing, the beam switching capability indicating a threshold quantity of symbol periods between beam switching operations, determine that the beam switching capability of the UE is satisfied based on the first symbol period, a second symbol period of the transmission time interval, the indicated threshold quantity of symbol periods, and the adjustment parameter, and identify an adjustment parameter associated with a first symbol period of the transmission time interval.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic input/output (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam switching operation for systems with high subcarrier spacing).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
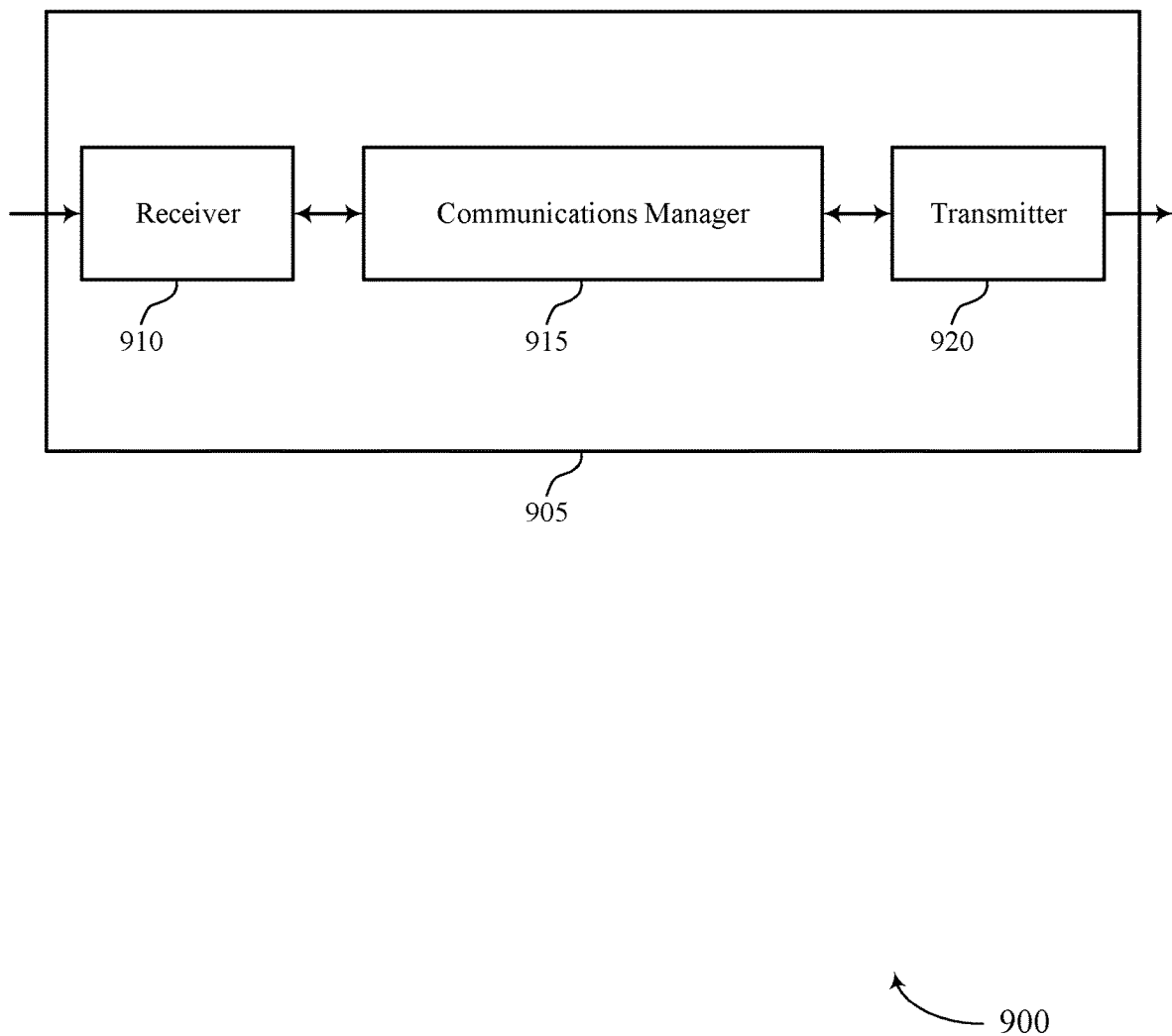
FIGS. 9 and 10 show block diagrams of devices that support beam switching operation for systems with high subcarrier spacing in accordance with aspects of the present disclosure.

FIG. 9 shows a block diagram 900 of a device 905 that supports beam switching operation for systems with high subcarrier spacing in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam switching operation for systems with high subcarrier spacing, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a beam switching capability of a UE associated with a subcarrier spacing, the beam switching capability indicating a threshold quantity of beam switches during a transmission time interval, determine that the beam switching capability of the UE is satisfied based on comparing a first quantity of beam switches associated with a first symbol period of the transmission time interval and a second quantity of beam switches associated with remaining symbol periods of the transmission time interval with a threshold quantity of beam switches, and transmit an indication for the UE to perform one or more beam switching operations based on determining that the beam switching capability is satisfied. The communications manager 915 may also identify a beam switching capability of a UE associated with a subcarrier spacing, the beam switching capability indicating a threshold quantity of symbol periods between beam switching operations, identify an adjustment parameter associated with a first symbol period of the transmission time interval, determine a first symbol period for the UE to perform a first beam switching operation and a second symbol period for the UE to perform a second beam switching operation based on the beam switching capability of the UE and the adjustment parameter, and transmit, to the UE, an indication to perform the first beam switching operation during the first symbol period and to perform the second beam switching operation during the second symbol period. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
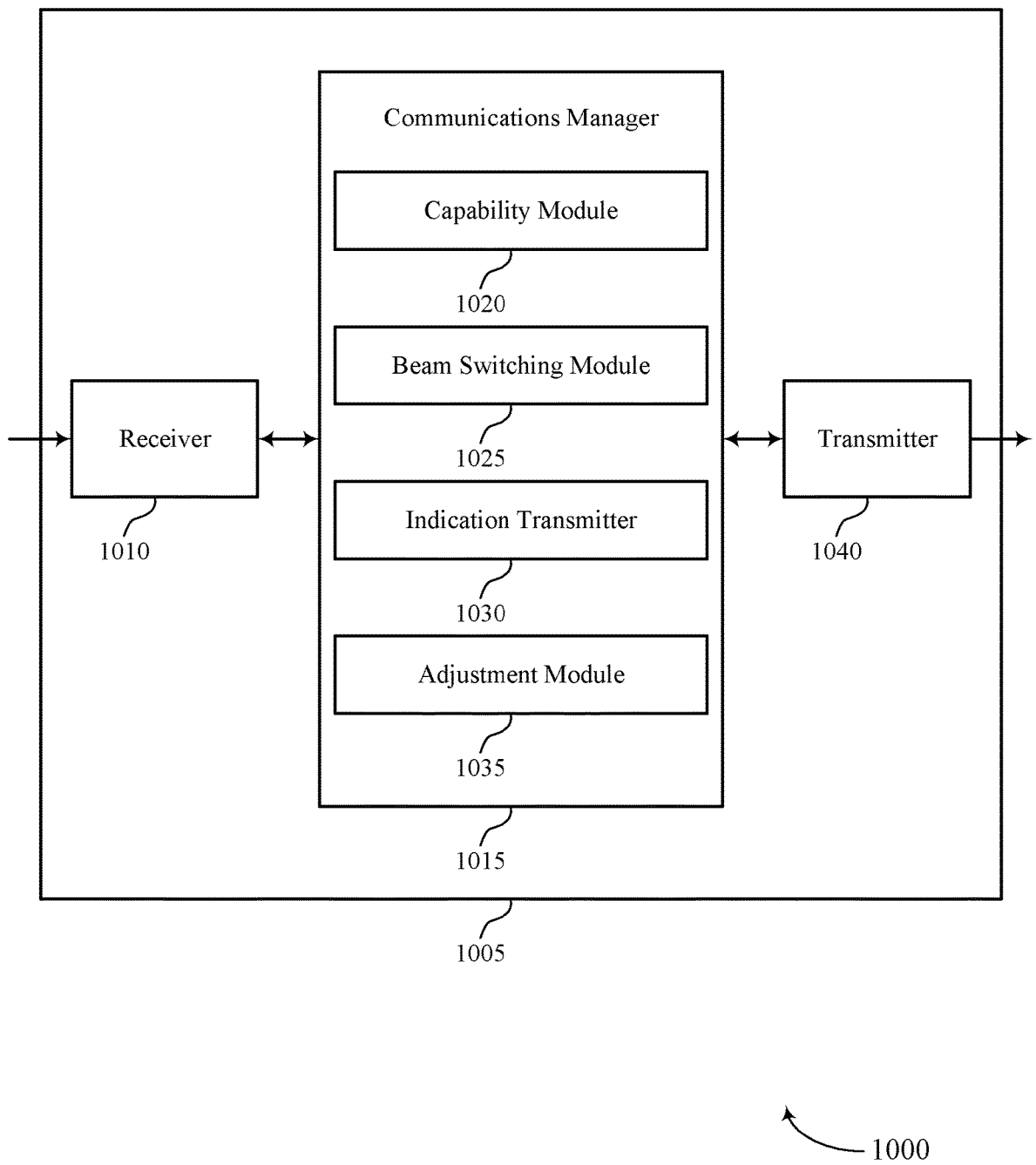

FIG. 10 shows a block diagram 1000 of a device 1005 that supports beam switching operation for systems with high subcarrier spacing in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to beam switching operation for systems with high subcarrier spacing, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability module 1020, a beam switching module 1025, an indication transmitter 1030, and an adjustment module 1035. The communications manager 1015 may be an example of aspects of the communications manager 1210 described herein.

The capability module 1020 may identify a beam switching capability of a UE associated with a subcarrier spacing, the beam switching capability indicating a threshold quantity of beam switches during a transmission time interval. The beam switching module 1025 may determine that the beam switching capability of the UE is satisfied based on comparing a first quantity of beam switches associated with a first symbol period of the transmission time interval and a second quantity of beam switches associated with remaining symbol periods of the transmission time interval with a threshold quantity of beam switches. The indication transmitter 1030 may transmit an indication for the UE to perform one or more beam switching operations based on determining that the beam switching capability is satisfied.

The capability module 1020 may identify a beam switching capability of a UE associated with a subcarrier spacing, the beam switching capability indicating a threshold quantity of symbol periods between beam switching operations. The adjustment module 1035 may identify an adjustment parameter associated with a first symbol period of the transmission time interval. The beam switching module 1025 may determine a first symbol period for the UE to perform a first beam switching operation and a second symbol period for the UE to perform a second beam switching operation based on the beam switching capability of the UE and the adjustment parameter. The indication transmitter 1030 may transmit, to the UE, an indication to perform the first beam switching operation during the first symbol period and to perform the second beam switching operation during the second symbol period.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
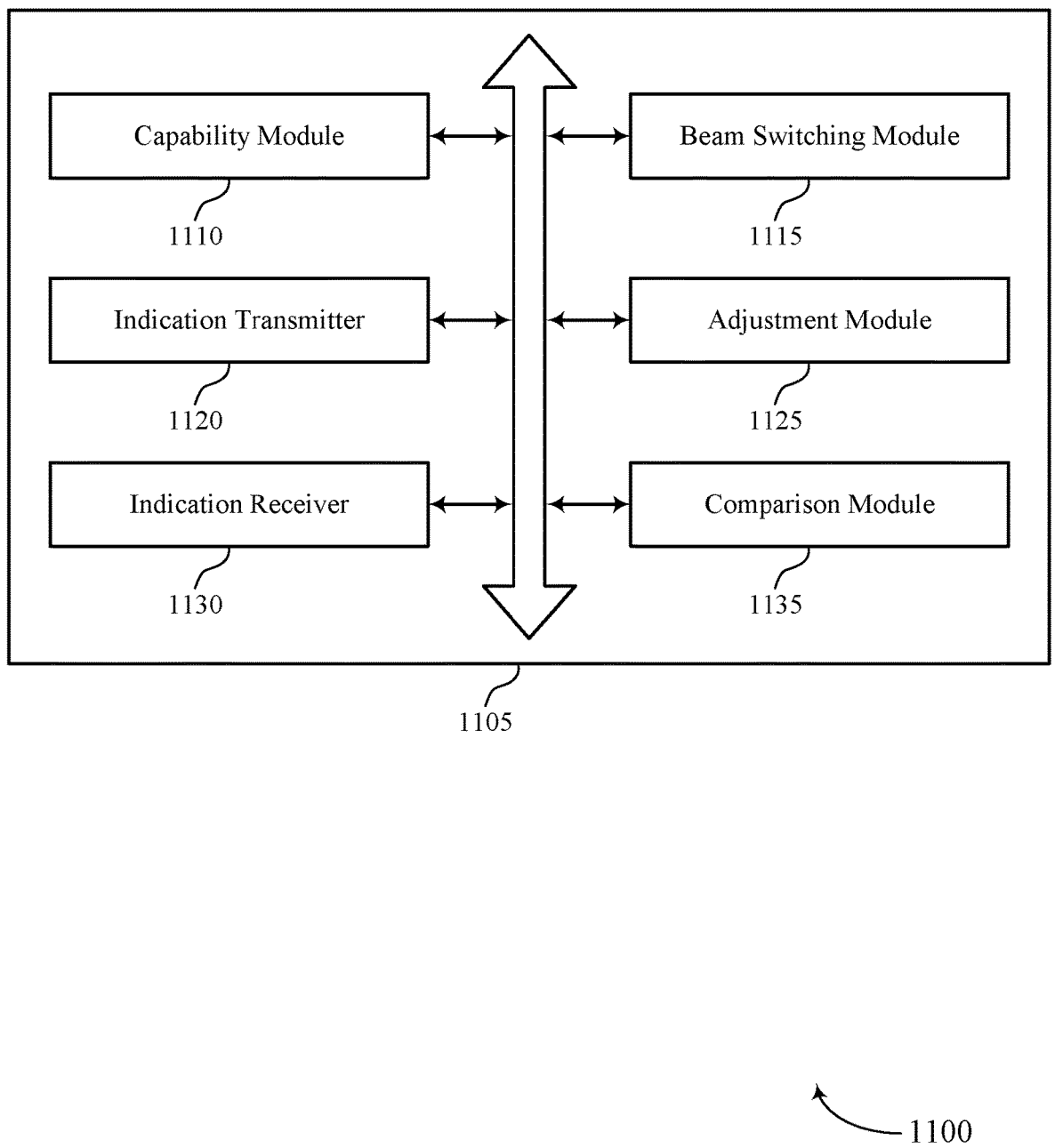
FIG. 11 shows a block diagram of a communications manager that supports beam switching operation for systems with high subcarrier spacing in accordance with aspects of the present disclosure.

FIG. 11 shows a block diagram 1100 of a communications manager 1105 that supports beam switching operation for systems with high subcarrier spacing in accordance with aspects of the present disclosure. The communications manager 1105 may be an example of aspects of a communications manager 915, a communications manager 1015, or a communications manager 1210 described herein. The communications manager 1105 may include a capability module 1110, a beam switching module 1115, an indication transmitter 1120, an adjustment module 1125, an indication receiver 1130, and a comparison module 1135. Each of these modules may communicate, directly or indirectly, with one another (e.g., via one or more buses).

The capability module 1110 may identify a beam switching capability of a UE associated with a subcarrier spacing, the beam switching capability indicating a threshold quantity of beam switches during a transmission time interval. In some examples, the capability module 1110 may identify a beam switching capability of a UE associated with a subcarrier spacing, the beam switching capability indicating a threshold quantity of symbol periods between beam switching operations.

The beam switching module 1115 may determine that the beam switching capability of the UE is satisfied based on comparing a first quantity of beam switches associated with a first symbol period of the transmission time interval and a second quantity of beam switches associated with remaining symbol periods of the transmission time interval with a threshold quantity of beam switches. In some examples, the beam switching module 1115 may determine a first symbol period for the UE to perform a first beam switching operation and a second symbol period for the UE to perform a second beam switching operation based on the beam switching capability of the UE and the adjustment parameter.

In some examples, the beam switching module 1115 may determine the first quantity of beam switches based on the identified adjustment parameter. In some examples, the beam switching module 1115 may determine that the sum satisfies the threshold quantity of beam switches. In some examples, the beam switching module 1115 may perform a first beam switching operation during the first symbol period of the transmission time interval. In some examples, the beam switching module 1115 may perform a second beam switching operation during the second symbol period of the transmission time interval.

In some cases, the first symbol period of the transmission time interval is located at a boundary between the transmission time interval and a prior transmission time interval. In some cases, a size of the first symbol period is larger than a size of the remaining symbol periods. In some cases, a first cyclic prefix duration of the first symbol period is larger than a second cyclic prefix duration of symbol periods of the remaining symbol periods The indication transmitter 1120 may transmit an indication for the UE to perform one or more beam switching operations based on determining that the beam switching capability is satisfied. In some examples, the indication transmitter 1120 may transmit, to the UE, an indication to perform the first beam switching operation during the first symbol period and to perform the second beam switching operation during the second symbol period.

The adjustment module 1125 may identify an adjustment parameter associated with a first symbol period of the transmission time interval. In some examples, the adjustment module 1125 may identify an adjustment parameter associated with the first quantity of beam switches. In some examples, the adjustment module 1125 may adjust a value of the first quantity of beam switches based on the identified adjustment parameter.

In some examples, the adjustment module 1125 may scale the value of the first quantity of beam switches by the adjustment parameter, subtracting a value of the adjustment parameter from the value of the first quantity of beam switches, or a combination thereof.

In some examples, the adjustment module 1125 may adjust the threshold quantity of symbol periods based on the adjustment parameter. In some examples, the adjustment module 1125 may scale a value of the threshold quantity of symbol periods by the adjustment parameter, subtracting a value of the adjustment parameter from the value of the threshold quantity of symbol periods, or a combination thereof.

The indication receiver 1130 may receive, from the UE, an indication of the adjustment parameter, the beam switching capability, or both. In some examples, the indication receiver 1130 may receive, from the UE, an indication of the adjustment parameter, the beam switching capability, or both.

The comparison module 1135 may compare a sum of the first quantity of beam switches associated with the first symbol period and the second quantity of beam switches associated with the remaining symbol periods to the threshold quantity of beam switches.

In some examples, the comparison module 1135 may compare a quantity of symbol periods between the first beam switching operation and the second beam switching operation to the threshold quantity of symbol periods or a difference between the threshold quantity of symbol periods and the adjustment parameter.

Figure 12:
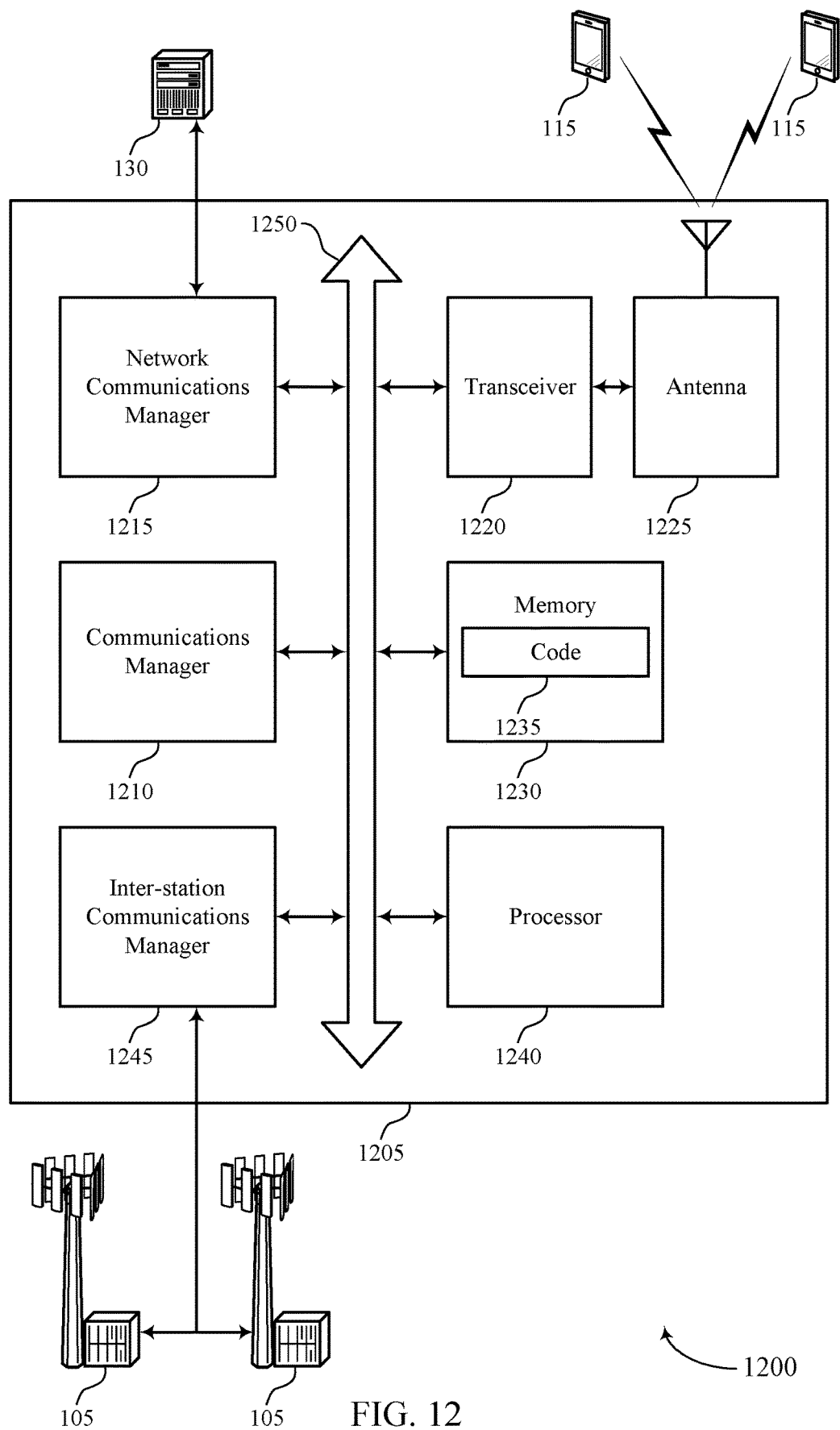
FIG. 12 shows a diagram of a system including a device that supports beam switching operation for systems with high subcarrier spacing in accordance with aspects of the present disclosure.

FIG. 12 shows a diagram of a system 1200 including a device 1205 that supports beam switching operation for systems with high subcarrier spacing in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a beam switching capability of a UE associated with a subcarrier spacing, the beam switching capability indicating a threshold quantity of beam switches during a transmission time interval, determine that the beam switching capability of the UE is satisfied based on comparing a first quantity of beam switches associated with a first symbol period of the transmission time interval and a second quantity of beam switches associated with remaining symbol periods of the transmission time interval with a threshold quantity of beam switches, and transmit an indication for the UE to perform one or more beam switching operations based on determining that the beam switching capability is satisfied. The communications manager 1210 may also identify a beam switching capability of a UE associated with a subcarrier spacing, the beam switching capability indicating a threshold quantity of symbol periods between beam switching operations, identify an adjustment parameter associated with a first symbol period of the transmission time interval, determine a first symbol period for the UE to perform a first beam switching operation and a second symbol period for the UE to perform a second beam switching operation based on the beam switching capability of the UE and the adjustment parameter, and transmit, to the UE, an indication to perform the first beam switching operation during the first symbol period and to perform the second beam switching operation during the second symbol period.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam switching operation for systems with high subcarrier spacing).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
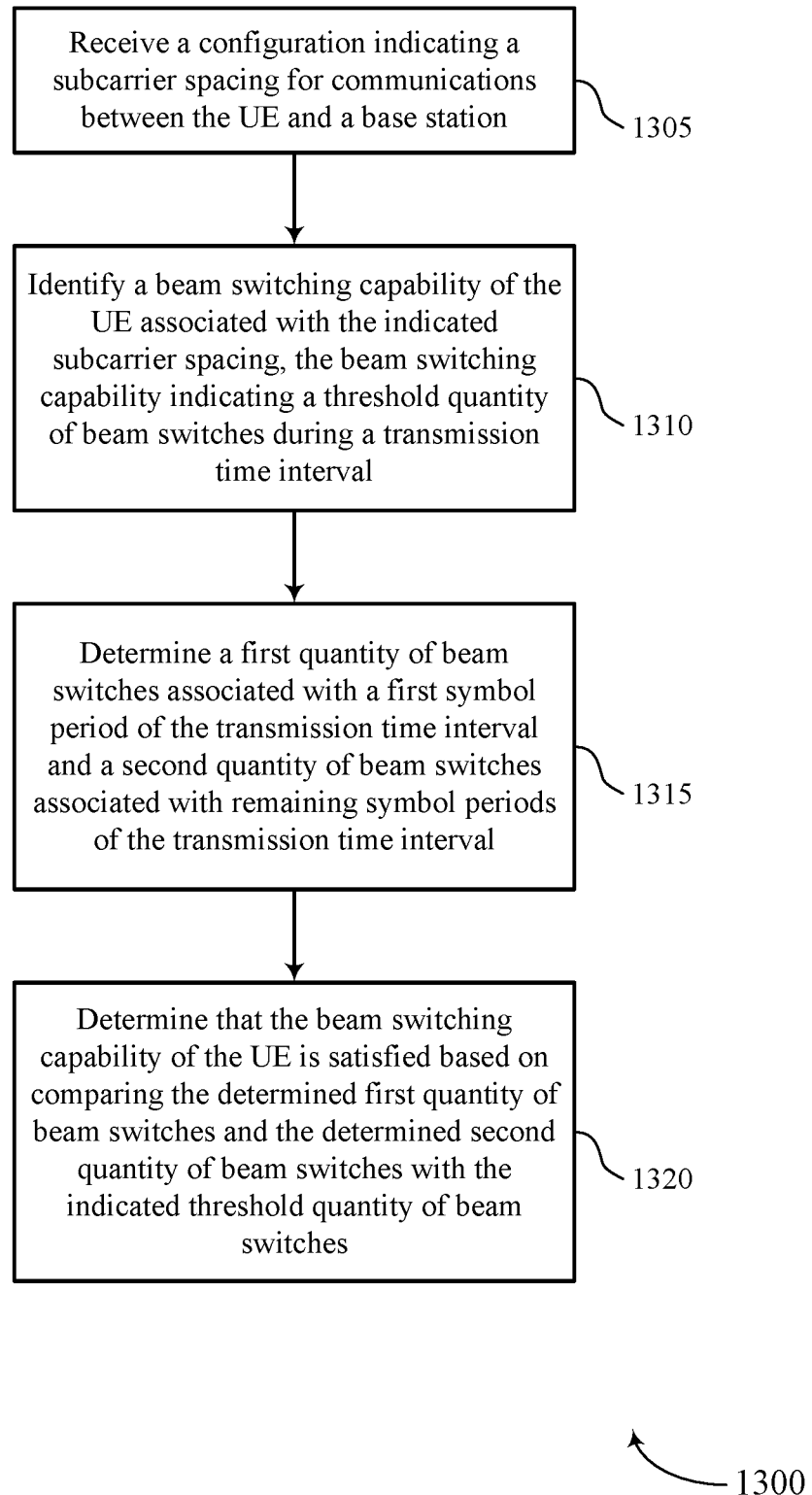
FIGS. 13 through 16 show flowcharts illustrating methods that support beam switching operation for systems with high subcarrier spacing in accordance with aspects of the present disclosure.

FIG. 13 shows a flowchart illustrating a method 1300 that supports beam switching operation for systems with high subcarrier spacing in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration indicating a subcarrier spacing for communications between the UE and a base station. The operations of 1305 may be performed according to the methods described herein. In some examples, aspects of the operations of 1305 may be performed by a configuration component as described with reference to FIGS. 5 through 8.

At 1310, the UE may identify a beam switching capability of the UE associated with the indicated subcarrier spacing, the beam switching capability indicating a threshold quantity of beam switches during a transmission time interval. The operations of 1310 may be performed according to the methods described herein. In some examples, aspects of the operations of 1310 may be performed by a capability component as described with reference to FIGS. 5 through 8.

At 1315, the UE may determine a first quantity of beam switches associated with a first symbol period of the transmission time interval and a second quantity of beam switches associated with remaining symbol periods of the transmission time interval. The operations of 1315 may be performed according to the methods described herein. In some examples, aspects of the operations of 1315 may be performed by a beam switching component as described with reference to FIGS. 5 through 8.

At 1320, the UE may determine that the beam switching capability of the UE is satisfied based on comparing the determined first quantity of beam switches and the determined second quantity of beam switches with the indicated threshold quantity of beam switches. The operations of 1320 may be performed according to the methods described herein. In some examples, aspects of the operations of 1320 may be performed by a capability component as described with reference to FIGS. 5 through 8.

Figure 14:
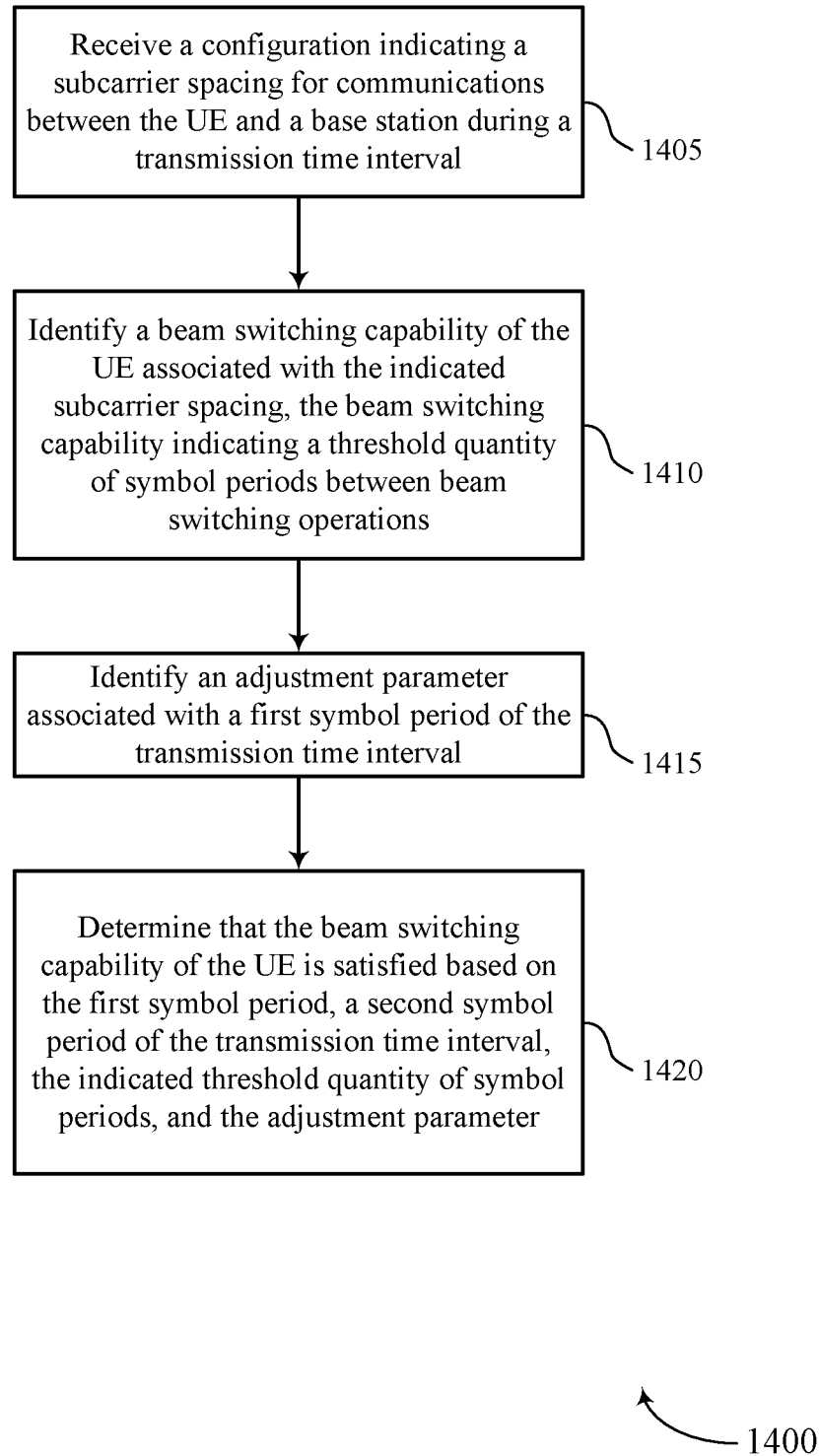

FIG. 14 shows a flowchart illustrating a method 1400 that supports beam switching operation for systems with high subcarrier spacing in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration indicating a subcarrier spacing for communications between the UE and a base station during a transmission time interval. The operations of 1405 may be performed according to the methods described herein. In some examples, aspects of the operations of 1405 may be performed by a configuration component as described with reference to FIGS. 5 through 8.

At 1410, the UE may identify a beam switching capability of the UE associated with the indicated subcarrier spacing, the beam switching capability indicating a threshold quantity of symbol periods between beam switching operations. The operations of 1410 may be performed according to the methods described herein. In some examples, aspects of the operations of 1410 may be performed by a capability component as described with reference to FIGS. 5 through 8.

At 1415, the UE may identify an adjustment parameter associated with a first symbol period of the transmission time interval. The operations of 1415 may be performed according to the methods described herein. In some examples, aspects of the operations of 1415 may be performed by an adjustment component as described with reference to FIGS. 5 through 8.

At 1420, the UE may determine that the beam switching capability of the UE is satisfied based on the first symbol period, a second symbol period of the transmission time interval, the indicated threshold quantity of symbol periods, and the adjustment parameter. The operations of 1420 may be performed according to the methods described herein. In some examples, aspects of the operations of 1420 may be performed by a capability component as described with reference to FIGS. 5 through 8.

Figure 15:
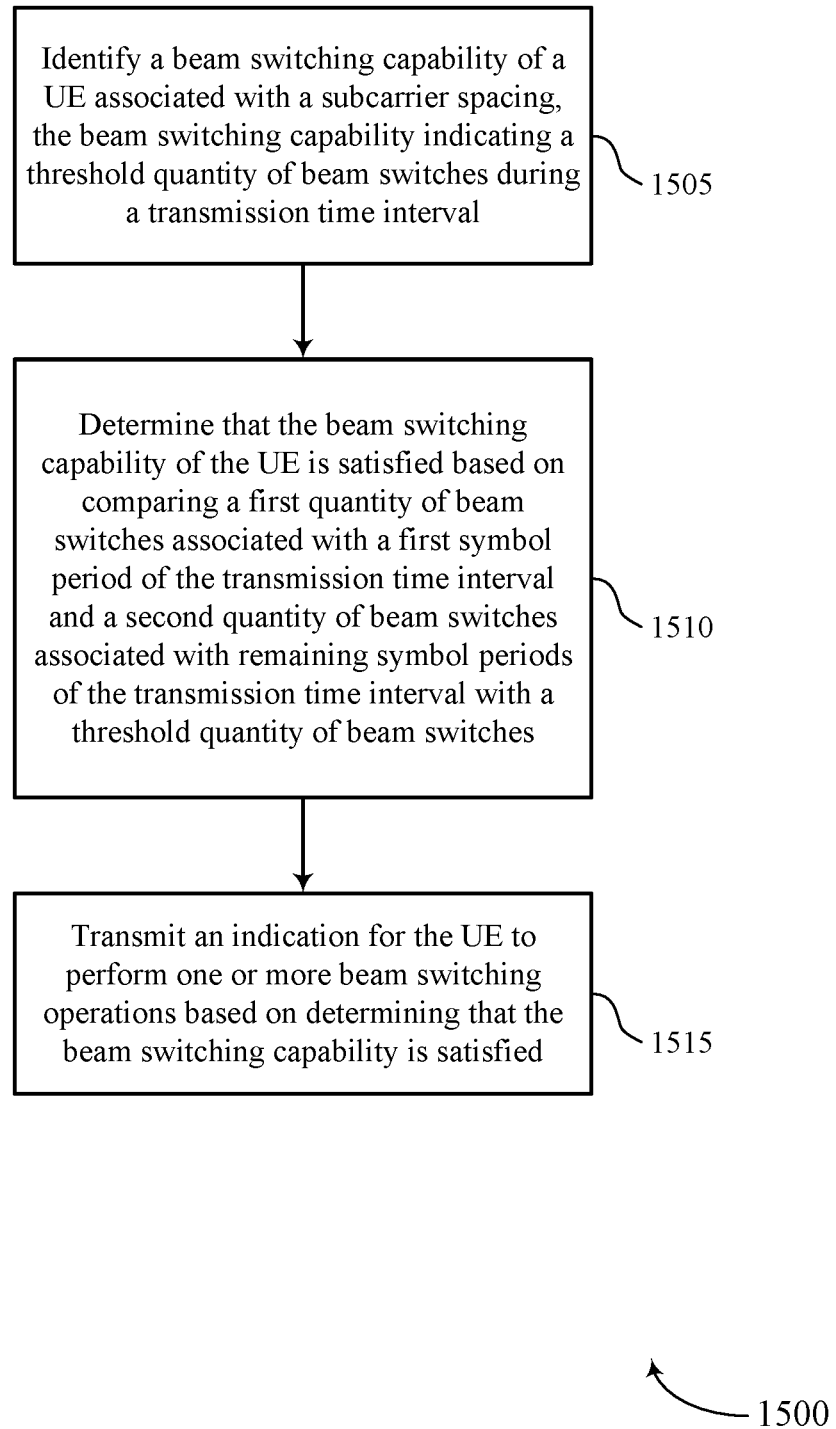

FIG. 15 shows a flowchart illustrating a method 1500 that supports beam switching operation for systems with high subcarrier spacing in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may identify a beam switching capability of a UE associated with a subcarrier spacing, the beam switching capability indicating a threshold quantity of beam switches during a transmission time interval. The operations of 1505 may be performed according to the methods described herein. In some examples, aspects of the operations of 1505 may be performed by a capability module as described with reference to FIGS. 9 through 12.

At 1510, the base station may determine that the beam switching capability of the UE is satisfied based on comparing a first quantity of beam switches associated with a first symbol period of the transmission time interval and a second quantity of beam switches associated with remaining symbol periods of the transmission time interval with a threshold quantity of beam switches. The operations of 1510 may be performed according to the methods described herein. In some examples, aspects of the operations of 1510 may be performed by a beam switching module as described with reference to FIGS. 9 through 12.

At 1515, the base station may transmit an indication for the UE to perform one or more beam switching operations based on determining that the beam switching capability is satisfied. The operations of 1515 may be performed according to the methods described herein. In some examples, aspects of the operations of 1515 may be performed by an indication transmitter as described with reference to FIGS. 9 through 12.

Figure 16:
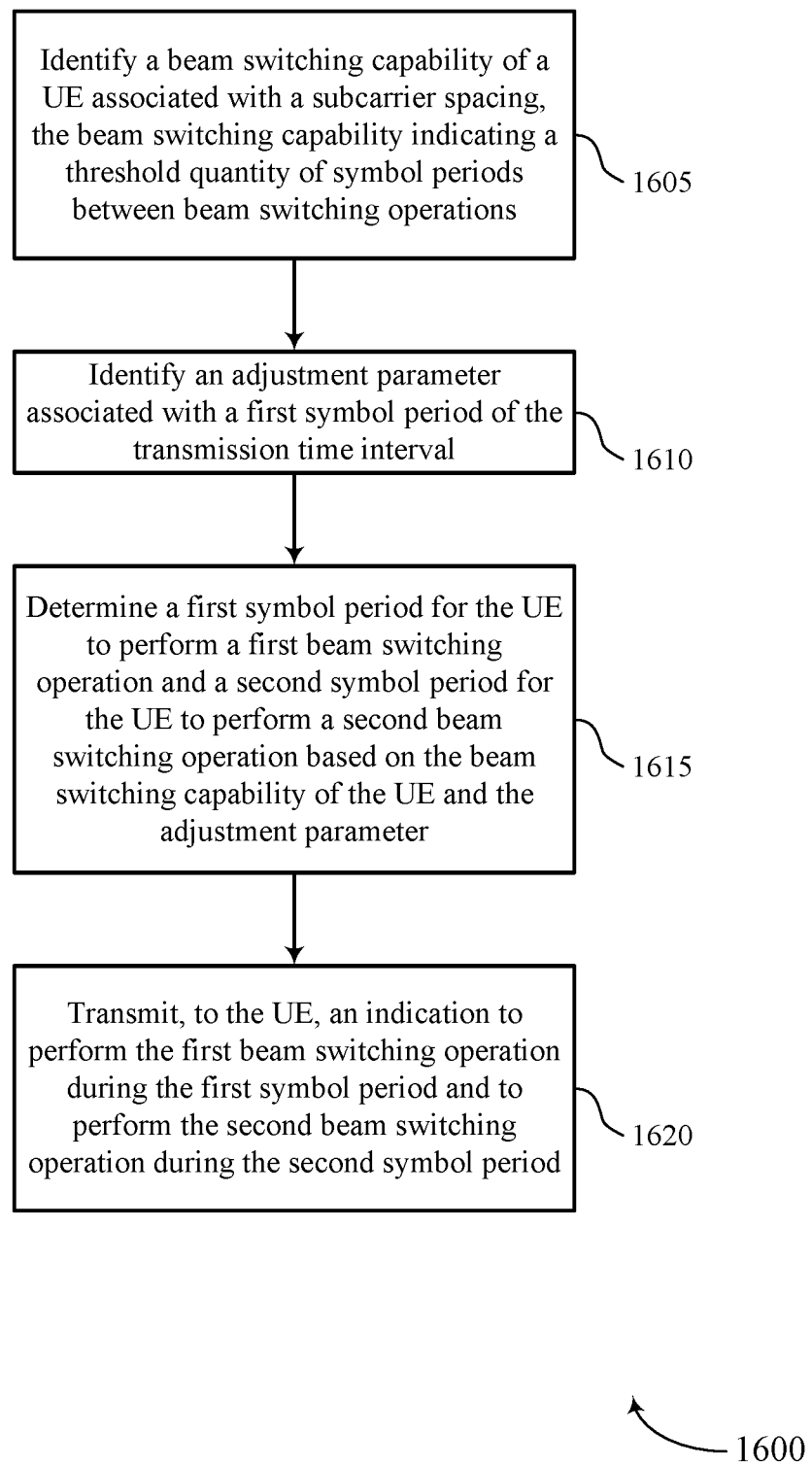

FIG. 16 shows a flowchart illustrating a method 1600 that supports beam switching operation for systems with high subcarrier spacing in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a beam switching capability of a UE associated with a subcarrier spacing, the beam switching capability indicating a threshold quantity of symbol periods between beam switching operations. The operations of 1605 may be performed according to the methods described herein. In some examples, aspects of the operations of 1605 may be performed by a capability module as described with reference to FIGS. 9 through 12.

At 1610, the base station may identify an adjustment parameter associated with a first symbol period of the transmission time interval. The operations of 1610 may be performed according to the methods described herein. In some examples, aspects of the operations of 1610 may be performed by an adjustment module as described with reference to FIGS. 9 through 12.

At 1615, the base station may determine a first symbol period for the UE to perform a first beam switching operation and a second symbol period for the UE to perform a second beam switching operation based on the beam switching capability of the UE and the adjustment parameter. The operations of 1615 may be performed according to the methods described herein. In some examples, aspects of the operations of 1615 may be performed by a beam switching module as described with reference to FIGS. 9 through 12.

At 1620, the base station may transmit, to the UE, an indication to perform the first beam switching operation during the first symbol period and to perform the second beam switching operation during the second symbol period. The operations of 1620 may be performed according to the methods described herein. In some examples, aspects of the operations of 1620 may be performed by an indication transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a configuration indicating a subcarrier spacing for communications between the UE and a base station; identifying a beam switching capability of the UE associated with the indicated subcarrier spacing, the beam switching capability indicating a threshold quantity of beam switches during a transmission time interval; determining a first quantity of beam switches associated with a first symbol period of the transmission time interval and a second quantity of beam switches associated with remaining symbol periods of the transmission time interval; and determining that the beam switching capability of the UE is satisfied based at least in part on comparing the determined first quantity of beam switches and the determined second quantity of beam switches with the indicated threshold quantity of beam switches.

Aspect 2: The method of aspect 1, further comprising: identifying an adjustment parameter associated with the first quantity of beam switches, wherein determining the first quantity of beam switches associated with the first symbol period is based at least in part on the identified adjustment parameter.

Aspect 3: The method of aspect 2, further comprising: adjusting a value of the first quantity of beam switches based at least in part on the identified adjustment parameter.

Aspect 4: The method of aspect 3, wherein adjusting the value of the first quantity of beam switches comprises: scaling the value of the first quantity of beam switches by the adjustment parameter, subtracting a value of the adjustment parameter from the value of the first quantity of beam switches, or a combination thereof.

Aspect 5: The method of any of aspects 2 through 4, further comprising: transmitting, to the base station, an indication of the adjustment parameter, the beam switching capability, or both.

Aspect 6: The method of any of aspects 2 through 5, wherein the adjustment parameter is indicated by the beam switching capability of the UE, a pre-configuration of the UE, or a combination thereof.

Aspect 7: The method of any of aspects 1 through 6, wherein determining that the beam switching capability of the UE is satisfied comprises: comparing a sum of the first quantity of beam switches associated with the first symbol period and the second quantity of beam switches associated with the remaining symbol periods to the threshold quantity of beam switches; and determining that the sum satisfies the threshold quantity of beam switches.

Aspect 8: The method of any of aspects 1 through 7, further comprising: performing one or more beam switching operations based at least in part on determining that the beam switching capability of the UE is satisfied.

Aspect 9: The method of any of aspects 1 through 8, wherein the first symbol period of the transmission time interval is located at a boundary between the transmission time interval and a prior transmission time interval.

Aspect 10: The method of any of aspects 1 through 9, wherein a size of the first symbol period is larger than a size of the remaining symbol periods.

Aspect 11: The method of aspect 10, wherein a first cyclic prefix duration of the first symbol period is larger than a second cyclic prefix duration of symbol periods of the remaining symbol periods.

Aspect 12: A method for wireless communications at a UE, comprising: receiving a configuration indicating a subcarrier spacing for communications between the UE and a base station during a transmission time interval; identifying a beam switching capability of the UE associated with the indicated subcarrier spacing, the beam switching capability indicating a threshold quantity of symbol periods between beam switching operations; identifying an adjustment parameter associated with a first symbol period of the transmission time interval; and determining that the beam switching capability of the UE is satisfied based at least in part on the first symbol period, a second symbol period of the transmission time interval, the indicated threshold quantity of symbol periods, and the adjustment parameter.

Aspect 13: The method of aspect 12, further comprising: adjusting the threshold quantity of symbol periods based at least in part on the adjustment parameter.

Aspect 14: The method of aspect 13, wherein adjusting the threshold quantity of symbol periods comprises: scaling a value of the threshold quantity of symbol periods by the adjustment parameter, subtracting a value of the adjustment parameter from the value of the threshold quantity of symbol periods, or a combination thereof.

Aspect 15: The method of any of aspects 12 through 14, further comprising: transmitting, to the base station, an indication of the adjustment parameter, the beam switching capability, or both.

Aspect 16: The method of any of aspects 12 through 15, wherein the adjustment parameter is indicated by the beam switching capability of the UE, a pre-configuration of the UE, or a combination thereof.

Aspect 17: The method of any of aspects 12 through 16, further comprising: performing a first beam switching operation during the first symbol period of the transmission time interval; and performing a second beam switching operation during the second symbol period of the transmission time interval.

Aspect 18: The method of aspect 17, wherein determining that the beam switching capability of the UE is satisfied comprises: comparing a quantity of symbol periods between the first beam switching operation and the second beam switching operation to the threshold quantity of symbol periods or a difference between the threshold quantity of symbol periods and the adjustment parameter.

Aspect 19: The method of any of aspects 12 through 18, wherein the first symbol period of the transmission time interval is located at a boundary between the transmission time interval and a prior transmission time interval.

Aspect 20: The method of any of aspects 12 through 19, wherein a size of the first symbol period is larger than a size of remaining symbol periods.

Aspect 21: The method of aspect 20, wherein a first cyclic prefix duration of the first symbol period is larger than a second cyclic prefix duration of symbol periods of remaining symbol periods.

Aspect 22: A method for wireless communications at base station, comprising: identifying a beam switching capability of a UE associated with a subcarrier spacing, the beam switching capability indicating a threshold quantity of beam switches during a transmission time interval; determining that the beam switching capability of the UE is satisfied based at least in part on comparing a first quantity of beam switches associated with a first symbol period of the transmission time interval and a second quantity of beam switches associated with remaining symbol periods of the transmission time interval with the threshold quantity of beam switches; and transmitting an indication for the UE to perform one or more beam switching operations based at least in part on determining that the beam switching capability is satisfied.

Aspect 23: The method of aspect 22, further comprising: identifying an adjustment parameter associated with the first quantity of beam switches; and determining the first quantity of beam switches based at least in part on the identified adjustment parameter.

Aspect 24: The method of aspect 23, further comprising: adjusting a value of the first quantity of beam switches based at least in part on the identified adjustment parameter.

Aspect 25: The method of aspect 24, wherein adjusting the value of the first quantity of beam switches comprises: scaling the value of the first quantity of beam switches by the adjustment parameter, subtracting a value of the adjustment parameter from the value of the first quantity of beam switches, or a combination thereof.

Aspect 26: The method of any of aspects 23 through 25, further comprising: receiving, from the UE, an indication of the adjustment parameter, the beam switching capability, or both.

Aspect 27: The method of any of aspects 22 through 26, wherein determining that the beam switching capability of the UE is satisfied comprises: comparing a sum of the first quantity of beam switches associated with the first symbol period and the second quantity of beam switches associated with the remaining symbol periods to the threshold quantity of beam switches; and determining that the sum satisfies the threshold quantity of beam switches.

Aspect 28: The method of any of aspects 22 through 27, wherein the first symbol period of the transmission time interval is located at a boundary between the transmission time interval and a prior transmission time interval.

Aspect 29: The method of any of aspects 22 through 28, wherein a size of the first symbol period is larger than a size of the remaining symbol periods.

Aspect 30: The method of aspect 29, wherein a first cyclic prefix duration of the first symbol period is larger than a second cyclic prefix duration of symbol periods of the remaining symbol periods.

Aspect 31: A method for wireless communications at a base station, comprising: identifying a beam switching capability of a UE associated with a subcarrier spacing, the beam switching capability indicating a threshold quantity of symbol periods between beam switching operations; identifying an adjustment parameter associated with a first symbol period of a transmission time interval; determining the first symbol period for the UE to perform a first beam switching operation and a second symbol period for the UE to perform a second beam switching operation based at least in part on the beam switching capability of the UE and the adjustment parameter; and transmitting, to the UE, an indication to perform the first beam switching operation during the first symbol period and to perform the second beam switching operation during the second symbol period.

Aspect 32: The method of aspect 31, further comprising: adjusting the threshold quantity of symbol periods based at least in part on the adjustment parameter.

Aspect 33: The method of aspect 32, wherein adjusting the threshold quantity of symbol periods comprises: scaling a value of the threshold quantity of symbol periods by the adjustment parameter, subtracting a value of the adjustment parameter from the value of the threshold quantity of symbol periods, or a combination thereof.

Aspect 34: The method of any of aspects 31 through 33, further comprising: receiving, from the UE, an indication of the adjustment parameter, the beam switching capability, or both.

Aspect 35: The method of any of aspects 31 through 34, further comprising: performing the first beam switching operation during the first symbol period of the transmission time interval; and performing the second beam switching operation during the second symbol period of the transmission time interval.

Aspect 36: The method of aspect 35, wherein determining that the beam switching capability of the UE is satisfied comprises: comparing a quantity of symbol periods between the first beam switching operation and the second beam switching operation to the threshold quantity of symbol periods or a difference between the threshold quantity of symbol periods and the adjustment parameter.

Aspect 37: The method of any of aspects 31 through 36, wherein the first symbol period of the transmission time interval is located at a boundary between the transmission time interval and a prior transmission time interval.

Aspect 38: The method of any of aspects 31 through 37, wherein a size of the first symbol period is larger than a size of remaining symbol periods.

Aspect 39: The method of aspect 38, wherein a first cyclic prefix duration of the first symbol period is larger than a second cyclic prefix duration of symbol periods of remaining symbol periods.

Aspect 40: An apparatus for wireless communications at a UE, comprising a processor; memory coupled with the processor; and instructions stored in the memory and executable by the processor to cause the apparatus to perform a method of any of aspects 1 through 11.

Aspect 41: An apparatus for wireless communications at a UE, comprising at least one means for performing a method of any of aspects 1 through 11.

Aspect 42: A non-transitory computer-readable medium storing code for wireless communications at a UE, the code comprising instructions executable by a processor to perform a method of any of aspects 1 through 11.

Aspect 43: An apparatus for wireless communications at a UE, comprising a processor; memory coupled with the processor; and instructions stored in the memory and executable by the processor to cause the apparatus to perform a method of any of aspects 12 through 21.

Aspect 44: An apparatus for wireless communications at a UE, comprising at least one means for performing a method of any of aspects 12 through 21.

Aspect 45: A non-transitory computer-readable medium storing code for wireless communications at a UE, the code comprising instructions executable by a processor to perform a method of any of aspects 12 through 21.

Aspect 46: An apparatus for wireless communications at base station, comprising a processor; memory coupled with the processor; and instructions stored in the memory and executable by the processor to cause the apparatus to perform a method of any of aspects 22 through 30.

Aspect 47: An apparatus for wireless communications at base station, comprising at least one means for performing a method of any of aspects 22 through 30.

Aspect 48: A non-transitory computer-readable medium storing code for wireless communications at base station, the code comprising instructions executable by a processor to perform a method of any of aspects 22 through 30.

Aspect 49: An apparatus for wireless communications at a base station, comprising a processor; memory coupled with the processor; and instructions stored in the memory and executable by the processor to cause the apparatus to perform a method of any of aspects 31 through 39.

Aspect 50: An apparatus for wireless communications at a base station, comprising at least one means for performing a method of any of aspects 31 through 39.

Aspect 51: A non-transitory computer-readable medium storing code for wireless communications at a base station, the code comprising instructions executable by a processor to perform a method of any of aspects 31 through 39.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving a configuration indicating a subcarrier spacing for communications between the UE and a base station;
identifying a beam switching capability of the UE associated with the indicated subcarrier spacing, the beam switching capability indicating a threshold quantity of beam switches during a transmission time interval;
determining a first quantity of beam switches associated with a first symbol period of the transmission time interval and a second quantity of beam switches associated with remaining symbol periods of the transmission time interval; and
determining that the beam switching capability of the UE is satisfied based at least in part on comparing the determined first quantity of beam switches and the determined second quantity of beam switches with the indicated threshold quantity of beam switches.

2. The method of claim 1, further comprising:
identifying an adjustment parameter associated with the first quantity of beam switches, wherein determining the first quantity of beam switches associated with the first symbol period is based at least in part on the identified adjustment parameter.

3. The method of claim 2, further comprising:
adjusting a value of the first quantity of beam switches based at least in part on the identified adjustment parameter.

4. The method of claim 3, wherein adjusting the value of the first quantity of beam switches comprises:
scaling the value of the first quantity of beam switches by the adjustment parameter, subtracting a value of the adjustment parameter from the value of the first quantity of beam switches, or a combination thereof.

5. The method of claim 2, further comprising:
transmitting, to the base station, an indication of the adjustment parameter, the beam switching capability, or both.

6. The method of claim 2, wherein the adjustment parameter is indicated by the beam switching capability of the UE, a pre-configuration of the UE, or a combination thereof.

7. The method of claim 1, wherein determining that the beam switching capability of the UE is satisfied comprises:
comparing a sum of the first quantity of beam switches associated with the first symbol period and the second quantity of beam switches associated with the remaining symbol periods to the threshold quantity of beam switches; and
determining that the sum satisfies the threshold quantity of beam switches.

8. The method of claim 1, further comprising:
performing one or more beam switching operations based at least in part on determining that the beam switching capability of the UE is satisfied.

9. The method of claim 1, wherein the first symbol period of the transmission time interval is located at a boundary between the transmission time interval and a prior transmission time interval.

10. The method of claim 1, wherein a size of the first symbol period is larger than a size of the remaining symbol periods.

11. The method of claim 10, wherein a first cyclic prefix duration of the first symbol period is larger than a second cyclic prefix duration of symbol periods of the remaining symbol periods.

12. A method for wireless communications at a user equipment (UE), comprising:
receiving a configuration indicating a subcarrier spacing for communications between the UE and a base station during a transmission time interval;
identifying a beam switching capability of the UE associated with the indicated subcarrier spacing, the beam switching capability indicating a threshold quantity of symbol periods between beam switching operations;
identifying an adjustment parameter associated with a first symbol period of the transmission time interval; and
determining that the beam switching capability of the UE is satisfied based at least in part on the first symbol period, a second symbol period of the transmission time interval, the indicated threshold quantity of symbol periods, and the adjustment parameter.

13. The method of claim 12, further comprising:
adjusting the threshold quantity of symbol periods based at least in part on the adjustment parameter.

14. The method of claim 13, wherein adjusting the threshold quantity of symbol periods comprises:
scaling a value of the threshold quantity of symbol periods by the adjustment parameter, subtracting a value of the adjustment parameter from the value of the threshold quantity of symbol periods, or a combination thereof.

15. The method of claim 12, further comprising:
transmitting, to the base station, an indication of the adjustment parameter, the beam switching capability, or both.

16. The method of claim 12, wherein the adjustment parameter is indicated by the beam switching capability of the UE, a pre-configuration of the UE, or a combination thereof.

17. The method of claim 12, further comprising:
performing a first beam switching operation during the first symbol period of the transmission time interval; and
performing a second beam switching operation during the second symbol period of the transmission time interval.

18. The method of claim 17, wherein determining that the beam switching capability of the UE is satisfied comprises:
comparing a quantity of symbol periods between the first beam switching operation and the second beam switching operation to the threshold quantity of symbol periods or a difference between the threshold quantity of symbol periods and the adjustment parameter.

19. The method of claim 12, wherein the first symbol period of the transmission time interval is located at a boundary between the transmission time interval and a prior transmission time interval.

20. The method of claim 12, wherein a size of the first symbol period is larger than a size of remaining symbol periods.

21. The method of claim 20, wherein a first cyclic prefix duration of the first symbol period is larger than a second cyclic prefix duration of symbol periods of remaining symbol periods.

22. A method for wireless communications at base station, comprising:
identifying a beam switching capability of a user equipment (UE) associated with a subcarrier spacing, the beam switching capability indicating a threshold quantity of beam switches during a transmission time interval;
determining that the beam switching capability of the UE is satisfied based at least in part on comparing a first quantity of beam switches associated with a first symbol period of the transmission time interval and a second quantity of beam switches associated with remaining symbol periods of the transmission time interval with the threshold quantity of beam switches; and transmitting an indication for the UE to perform one or more beam switching operations based at least in part on determining that the beam switching capability is satisfied.

23. The method of claim 22, further comprising:

identifying an adjustment parameter associated with the first quantity of beam switches;

determining the first quantity of beam switches based at least in part on the identified adjustment parameter; and adjusting a value of the first quantity of beam switches based at least in part on the identified adjustment parameter.

24. The method of claim 23, further comprising:

receiving, from the UE, an indication of the adjustment parameter, the beam switching capability, or both.

25. The method of claim 22, wherein determining that the beam switching capability of the UE is satisfied comprises:

comparing a sum of the first quantity of beam switches associated with the first symbol period and the second quantity of beam switches associated with the remaining symbol periods to the threshold quantity of beam switches; and determining that the sum satisfies the threshold quantity of beam switches.

26. A method for wireless communications at a base station, comprising:

identifying a beam switching capability of a user equipment (UE) associated with a subcarrier spacing, the beam switching capability indicating a threshold quantity of symbol periods between beam switching operations;

identifying an adjustment parameter associated with a first symbol period of a transmission time interval;

determining the first symbol period for the UE to perform a first beam switching operation and a second symbol period for the UE to perform a second beam switching operation based at least in part on the beam switching capability of the UE and the adjustment parameter; and transmitting, to the UE, an indication to perform the first beam switching operation during the first symbol period and to perform the second beam switching operation during the second symbol period.

27. The method of claim 26, further comprising:

adjusting the threshold quantity of symbol periods based at least in part on the adjustment parameter.

28. The method of claim 27, wherein adjusting the threshold quantity of symbol periods comprises:

scaling a value of the threshold quantity of symbol periods by the adjustment parameter, subtracting a value of the adjustment parameter from the value of the threshold quantity of symbol periods, or a combination thereof.

29. The method of claim 26, further comprising:

receiving, from the UE, an indication of the adjustment parameter, the beam switching capability, or both.

30. The method of claim 26, further comprising:

performing the first beam switching operation during the first symbol period of the transmission time interval; and performing the second beam switching operation during the second symbol period of the transmission time interval.

\* \* \* \* \*